US008126293B2

(12) United States Patent
Suematsu et al.

(10) Patent No.: US 8,126,293 B2
(45) Date of Patent: Feb. 28, 2012

(54) IMAGE PROCESSING APPARATUS, IMAGE PROCESSING METHOD, AND PROGRAM

(75) Inventors: Masayuki Suematsu, Chiba (JP); Takayuki Ohe, Saitama (JP); Masato Usuki, Kanagawa (JP); Masanari Yamamoto, Kanagawa (JP); Makoto Haitani, Kanagawa (JP)

(73) Assignee: Sony Corporation (JP)

( * ) Notice: Subject to any disclaimer, the term of this patent is extended or adjusted under 35 U.S.C. 154(b) by 960 days.

(21) Appl. No.: 12/082,619

(22) Filed: Apr. 10, 2008

(65) Prior Publication Data

US 2008/0253691 A1  Oct. 16, 2008

(30) Foreign Application Priority Data

Apr. 13, 2007 (JP) ................. P2007-106251

(51) Int. Cl.
  *G06K 9/32* (2006.01)
(52) U.S. Cl. ........................... 382/300; 345/475
(58) Field of Classification Search .................. 345/475,
  345/606; 348/402.1, 413.1, 416.1, 699, E7.007,
  348/E7.013, 538, E13.065, E7.012; 358/525;
  375/240.16, E17.104, E17.106, E17.123,
  375/E7.164, E7.256, E7.248, E7.25; 382/300;
  386/271; 700/189, 252; 704/265; 708/290,
  708/313, 847
See application file for complete search history.

(56) References Cited

U.S. PATENT DOCUMENTS

| 2003/0161404 A1 * | 8/2003 | Wu .................... 375/240.16 |
| 2003/0222994 A1 * | 12/2003 | Dawson .................... 348/247 |
| 2006/0072790 A1 * | 4/2006 | Wittebrood et al. .......... 382/107 |

FOREIGN PATENT DOCUMENTS

JP  2001-042831 A  2/2001

* cited by examiner

*Primary Examiner* — Gregory F Cunningham
(74) *Attorney, Agent, or Firm* — Lerner, David, Littenberg, Krumholz & Mentlik, LLP

(57) ABSTRACT

In the present invention, there is provided an image processing apparatus including: a detecting section configured to detect a motion vector from an input image signal acting as the image signal for each of chronologically input pixels; a determining section configured to determine whether the input image signal is cleared; and an interpolating section configured such that if the input image signal is not found cleared, then the interpolating section interpolates and outputs an input image signal intermediate signal interposed at a predetermined point in time between the uncleared input image signal and a preceding input image signal that precedes the uncleared input signal, in accordance with the motion vector; and if the input image signal is found cleared, then the interpolating section allows the input image signal to be output unchanged as the input image signal intermediate signal.

8 Claims, 17 Drawing Sheets

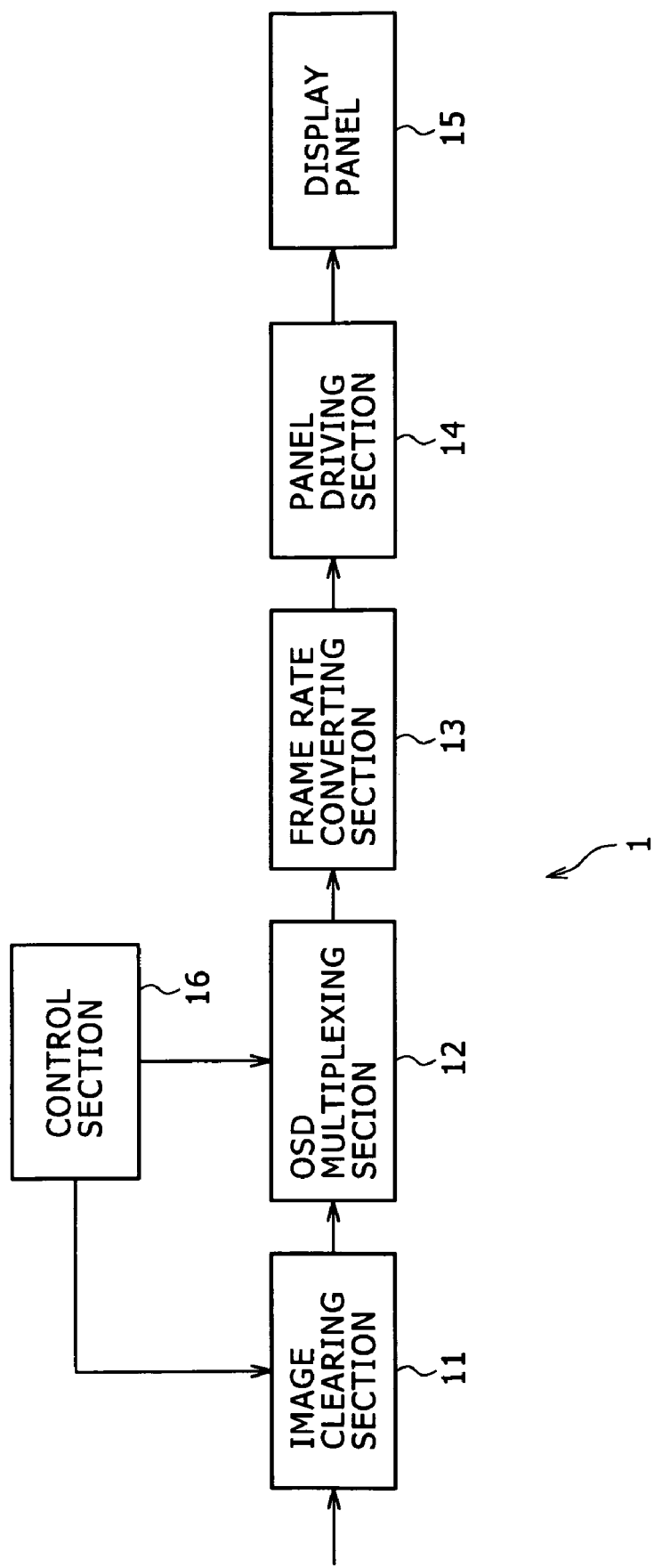

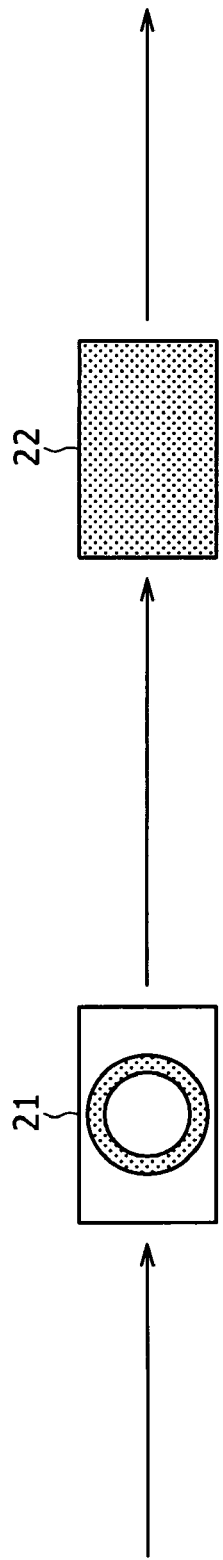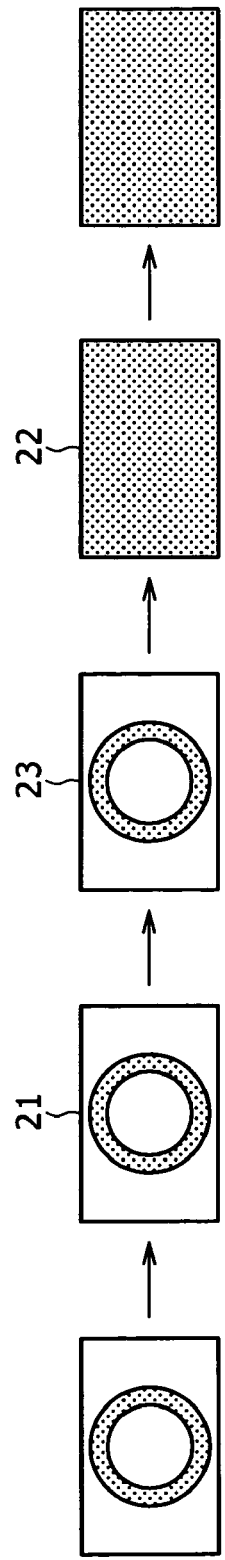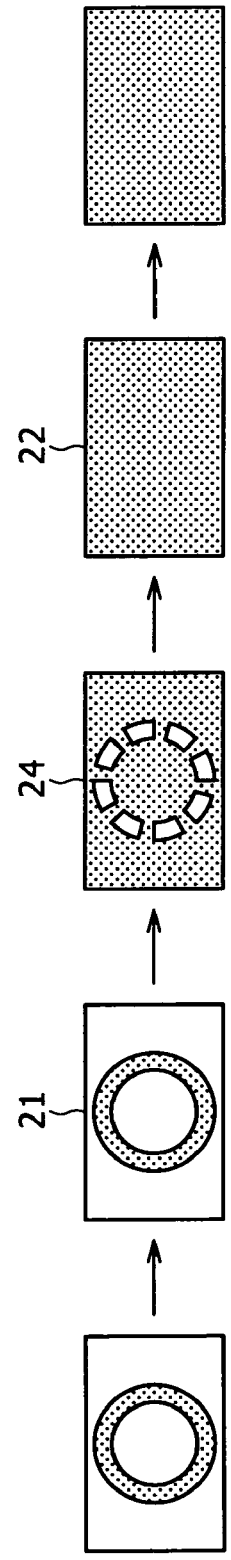

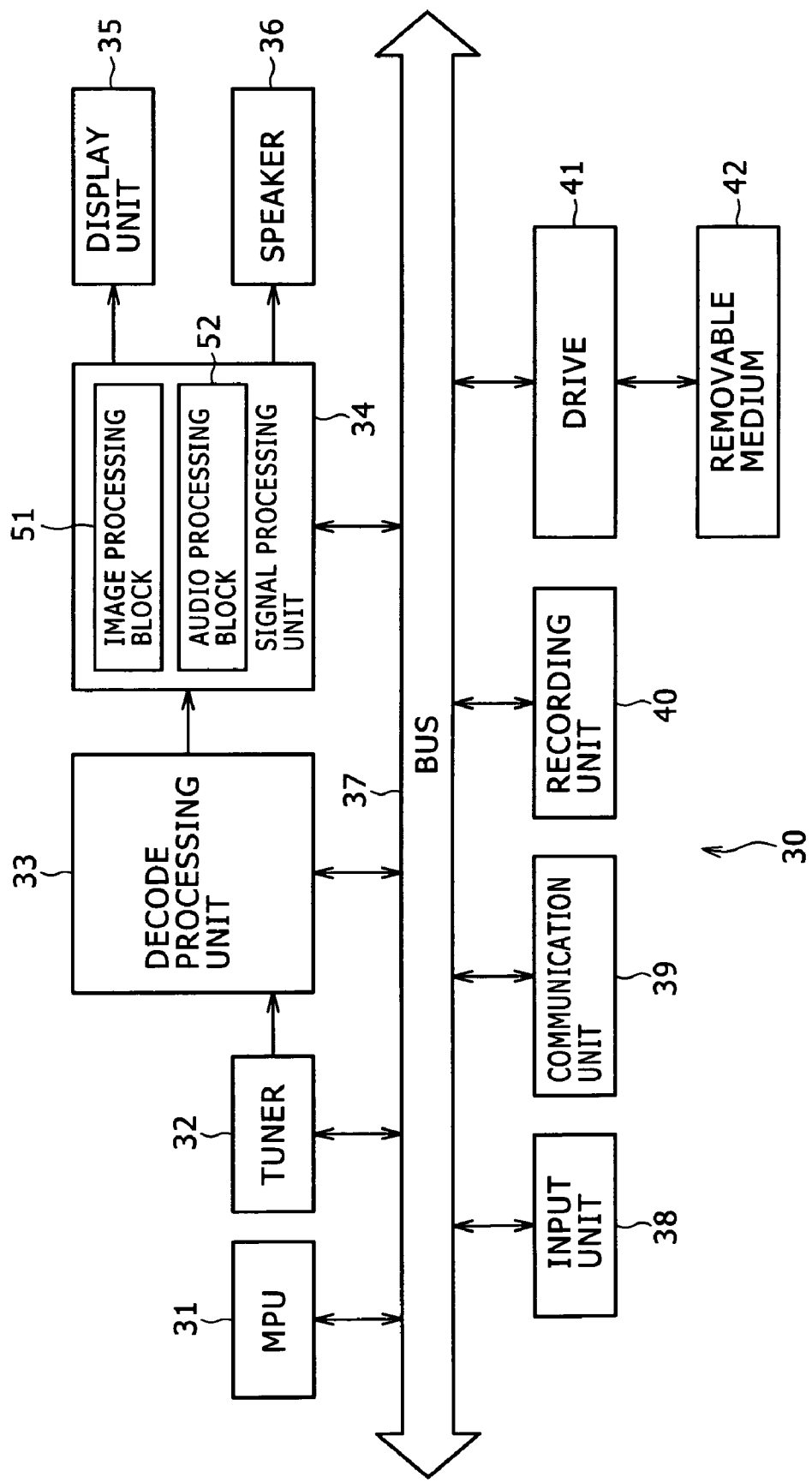

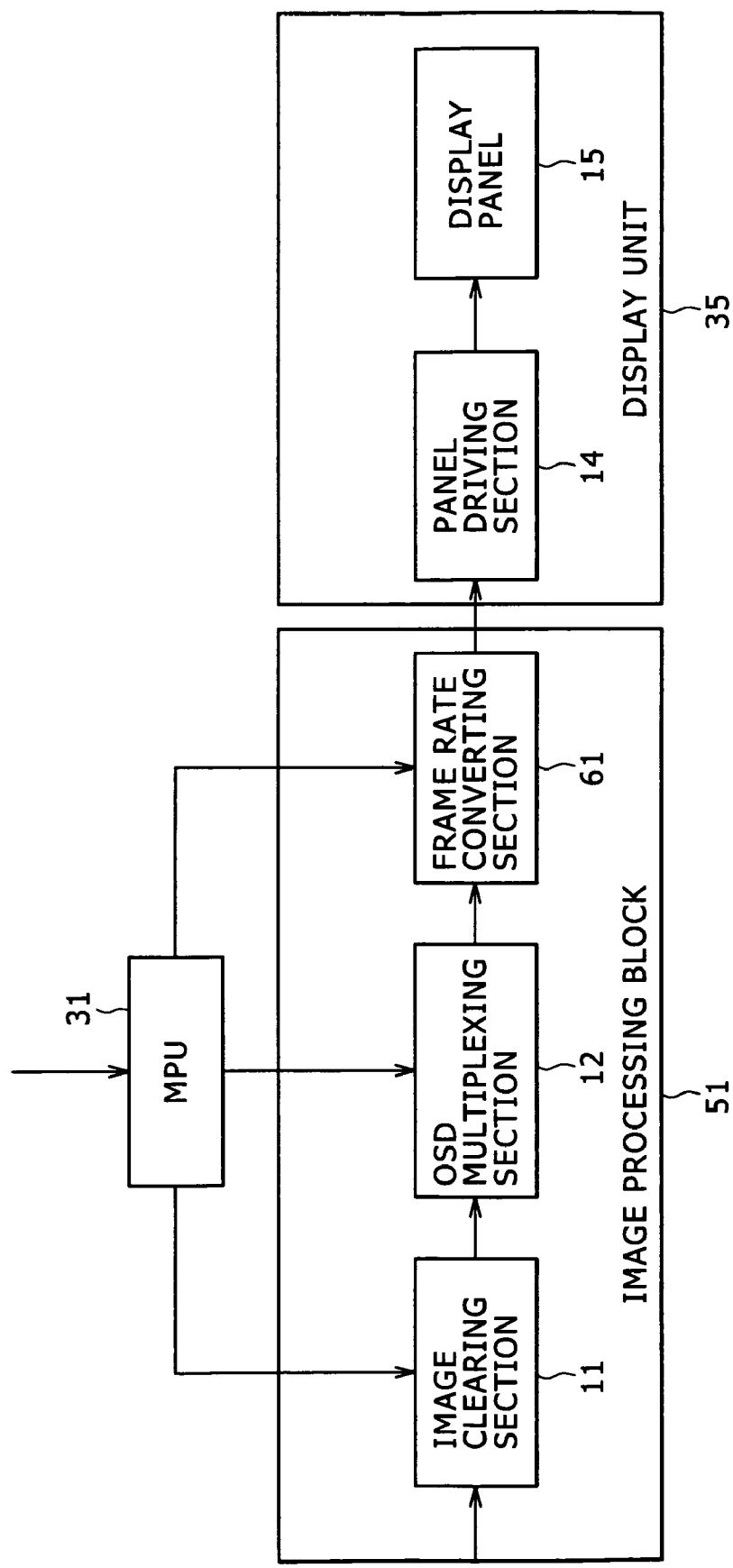

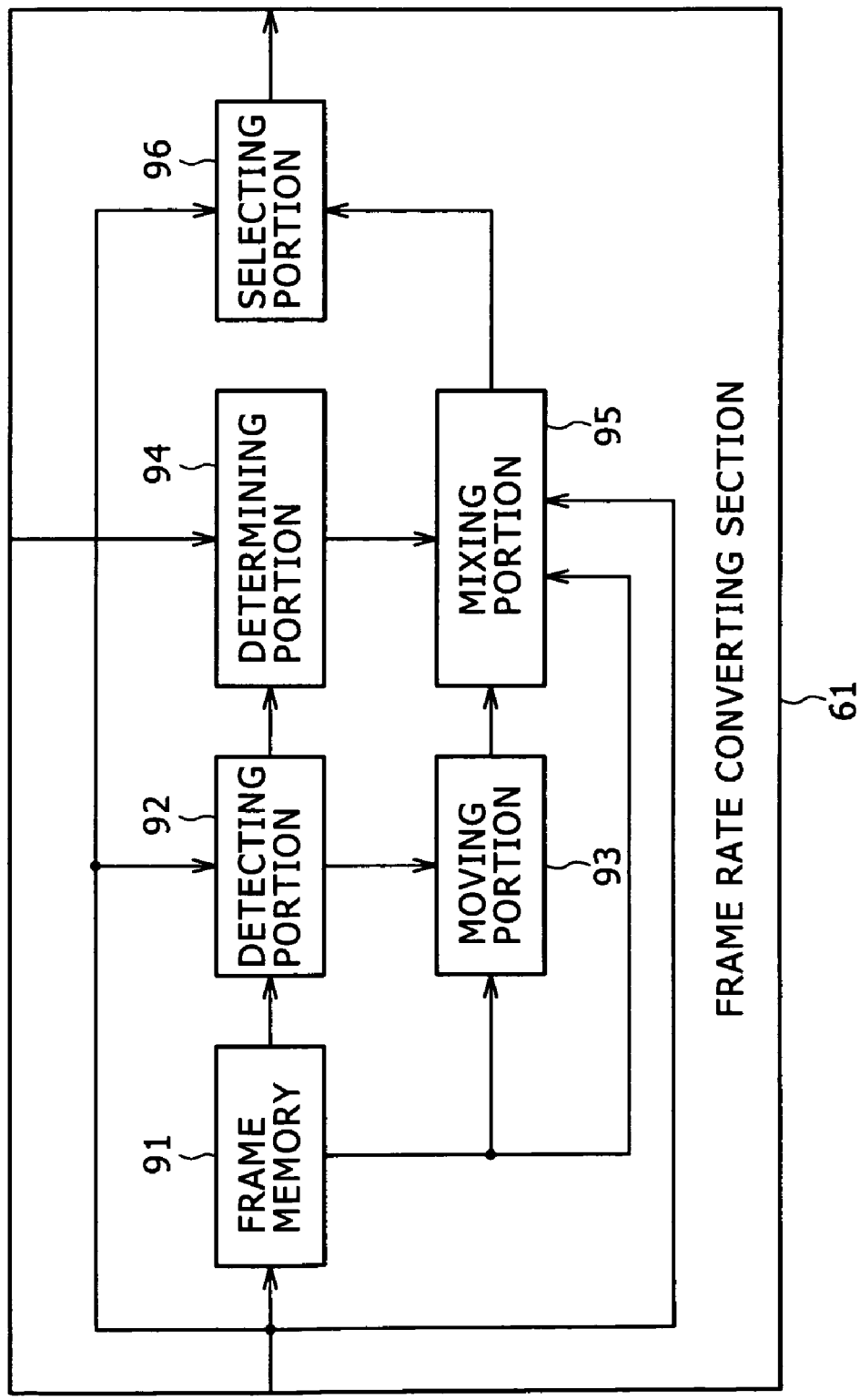

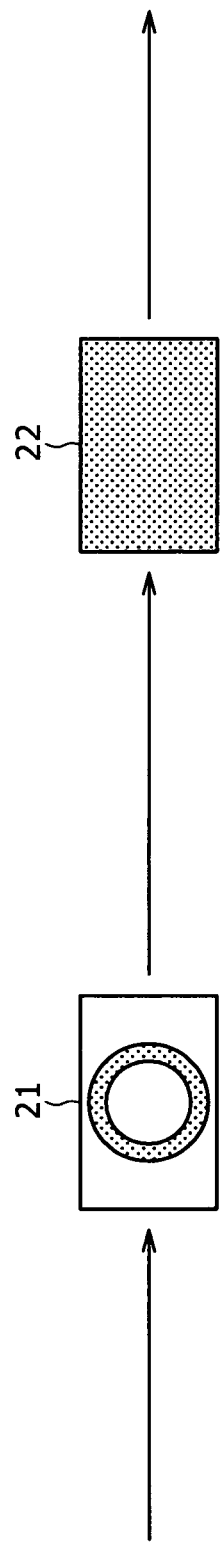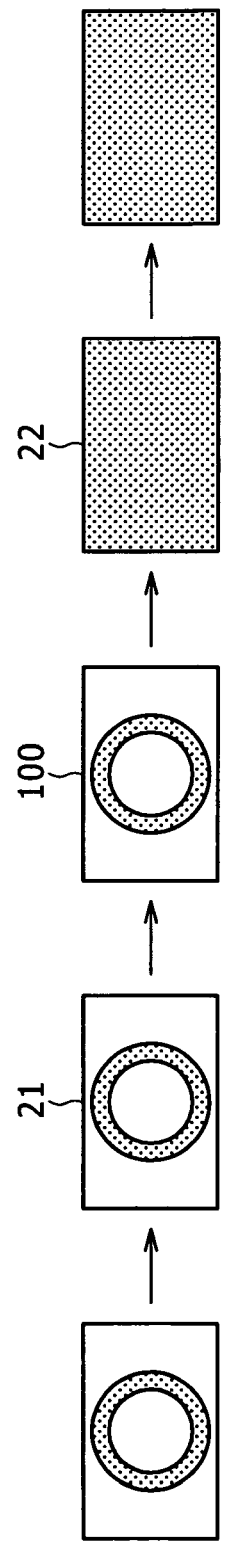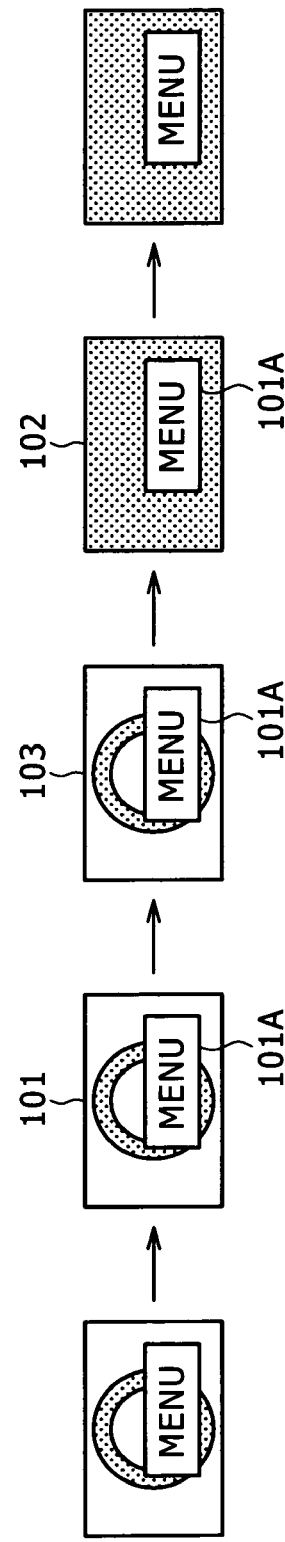

IMAGE PROCESSING APPARATUS, IMAGE PROCESSING METHOD, AND PROGRAM

CROSS-REFERENCE TO RELATED APPLICATIONS

The present application claims priority from Japanese Patent Application No. JP 2007-106251, filed in the Japanese Patent Office on Apr. 13, 2007, the entire content of which is incorporated herein by reference.

BACKGROUND OF THE INVENTION

1. Field of the Invention

The present invention relates to an image processing apparatus, an image processing method, and a program. More particularly, the invention relates to an image processing apparatus, an image processing method, and a program such that when an image signal before interpolation is cleared, the image quality of the image signal following interpolation is improved.

2. Description of the Related Art

FIG. 1 schematically shows a typical structure of an ordinary image processing apparatus 1.

In FIG. 1, the image processing apparatus 1 is made up of an image clearing section 11, an OSD multiplexing section 12, a frame rate converting section 13, a panel driving section 14, a display panel 15, and a control section 16. Illustratively, the image processing apparatus 1 displays chronologically ordered frame-by-frame images of a TV program by raising the frame rate of image signals that are the digital signal of each pixel.

In response to an image clear command signal supplied by the control section 16, the image clearing section 11 clears the image signal of an externally input TV program. More specifically, the image clearing section 11 turns the level of the image signals for all pixels to black (i.e., zero). The image clearing section 11 supplies the OSD multiplexing section 12 with the image signal having undergone the image clearing operation or with the input image signal without modification.

In accordance with a multiplex command signal coming from the control section 16, the OSD multiplexing section 12 multiplexes the image signal supplied by the image clearing section 11 with an image signal representative of OSD (on-screen display) images such as channel numbers and menus. The OSD multiplexing section 12 supplies the frame rate converting section 13 with the multiplexed image signal or with an unmodified image signal as supplied from the image clearing section 11.

Given the image signal from the OSD multiplexing section 12, the frame rate converting section 13 carries out a frame rate enhancement process for raising the frame rate (i.e. cycle) of the received image signal. More specifically, the frame rate converting section 13 first performs a frame interpolation process on the image signal supplied from the OSD multiplexing section 12. The image signal resulting from the interpolation is output to the panel driving section 14 as an image signal that is interposed chronologically between the externally input image signals. The process makes the frame rate of the input signal to the panel driving section 14 higher than the frame rate of the signal entering the image clearing section 11.

The panel driving section 14 performs D/A (digital/analog) conversion and other processes on the image signal supplied from the frame rate converting section 13. The resulting analog signal is used by the panel driving section 14 to drive the display panel 15 such as a liquid crystal display (LCD) panel whereby frame-by-frame images are displayed.

The control section 16 receives from a user such commands as an input change command for changing input sources of image signals, a channel change command for changing TV channels conveying image signals, and an OSD image display command. In response to the input change command or channel change command from the user, the control section 16 feeds an image clear command signal to the image clearing section 11. The operation makes it possible to prevent the image display from getting distorted upon input change or channel change. The control section 16 further supplies the OSD multiplexing section 12 with the multiplex command signal in accordance with OSD image display instructions.

The frame rate enhancement process performed by the frame rate converting section 13 in FIG. 1 is indispensable for improving the image quality of chronologically ordered image signals. The same holds true for frame interpolation used in the process for compensating the motions of such chronologically ordered image signals.

One way to implement the frame interpolation process involves first detecting a motion vector from chronologically input image signals and then using the detected motion vector to interpolate image signals at certain points in time between chronologically ordered image signals (as disclosed in Japanese Patent Laid-Open No. 2001-42831).

The motion vector is detected illustratively using the so-called block matching method whereby chronologically ordered image signals are compared with one another. In this case, the frame rate converting section 13 compares an image signal that has been cleared of its image with an image signal yet to be cleared at the beginning or at the end of an image clearing operation. As a result, an inaccurate motion vector is detected and used to generate an incorrect image signal, which leads to deterioration of the image quality of image signals subsequent to interpolation.

Illustratively, suppose that with an image clearing operation started as shown in FIG. 2A, the image signal of an uncleared image 21 having a black donut-shaped circle against a white background is fed to the frame rate converting section 13 followed by the image signal of a cleared image 22. In such a case, as shown in FIG. 2B, the ideal is that the frame rate converting section 13 interpolates the image signal of an image 23 identical to the image 21 and that the identical image 23 is kept displayed immediately up until the cleared image 22 is displayed.

In practice, the frame rate converting section 13 detects the motion vector by comparing the image signal of the uncleared image 21 with the image signal of the cleared image 22. The motion vector thus detected is used to interpolate the image signal of an aberrant image 24 having a black-and-white striped donut-shaped circle against the black background as shown in FIG. 2C. The result is a deteriorated quality of the image immediately before the cleared image 22.

Although not shown, the image signal of the cleared image is compared likewise with the image signal of the subsequent uncleared image at the end of the image clearing operation. The result is a similarly degraded quality of the image immediately before the uncleared image.

SUMMARY OF THE INVENTION

As described above, when an image clearing operation is carried out before the frame interpolation process, the image quality of the image signal following interpolation is deteriorated at the beginning or at the end of the image clearing operation.

The present invention has been made in view of the above circumstances and provides arrangements such that when the image signal before interpolation is cleared, the image quality of the image signal following interpolation is enhanced.

In carrying out the present invention and according to one embodiment thereof, there is provided an image processing apparatus including: a detecting section configured to detect a motion vector from an input image signal acting as the image signal for each of chronologically input pixels; a determining section configured to determine whether the input image signal is cleared; and an interpolating section configured to interpolate and output, if the input image signal is not found cleared, an input image signal intermediate signal interposed at a predetermined point in time between the uncleared input image signal and a preceding input image signal that precedes the uncleared input signal, in accordance with the motion vector; and if the input image signal is found cleared, then the interpolating section allows the input image signal to be output unchanged as the input image signal intermediate signal.

Preferably, the image processing apparatus of the embodiment of the present invention may further include an image clearing section configured to clear the input image signal.

Preferably, the image processing apparatus of the embodiment of the present invention may further include a receiving section configured to receive a predetermined command; wherein, if the predetermined command is received, then the determining section may determine that the input image signal is cleared; and wherein, if the predetermined command is received, then the image clearing section may clear the input image signal.

Preferably, the determining section may determine whether the input image signal is cleared based on a histogram of levels in the input image signal, on the number of pixels for which the input image signal is at a zero level, and on chronological changes in the input image signal.

Preferably, the image processing apparatus of the embodiment of the present invention may further include an acquiring section configured to acquire an image clear signal which is input from another apparatus and which indicates that the input image signal is cleared; wherein the input image signal may be input from that another apparatus; and wherein the determining section may determine whether the input image signal is cleared in accordance with the image clear signal.

According to another embodiment of the present invention, there is provided an image processing method for use with an image processing apparatus for interpolating an input image signal acting as the image signal for each of chronologically input pixels, the image processing method including the steps of: detecting a motion vector from the input image signal; determining whether the input image signal is cleared; if the input image signal is not found cleared, then interpolating and outputting an input image signal intermediate signal interposed at a predetermined point in time between the uncleared input image signal and a preceding input image signal that precedes the uncleared input signal, in accordance with the motion vector; and if the input image signal is found cleared, then allowing the input image signal to be output unchanged as the input image signal intermediate signal.

According to a further embodiment of the present invention, there is provided a program for causing a computer to perform an image processing procedure for interpolating an input image signal acting as the image signal for each of chronologically input pixels, the image processing procedure including the steps of: detecting a motion vector from the input image signal; determining whether the input image signal is cleared; if the input image signal is not found cleared, then interpolating and outputting an input image signal intermediate signal interposed at a predetermined point in time between the uncleared input image signal and a preceding input image signal that precedes the uncleared input signal, in accordance with the motion vector; and if the input image signal is found cleared, then allowing the input image signal to be output unchanged as the input image signal intermediate signal.

Where the image processing apparatus, image processing method, or program of the embodiments of the present invention is in use, a motion vector is first detected from an input image signal acting as the image signal for each of chronologically input pixels. A check is then made to determine whether the input image signal is cleared. If the input image signal is not found cleared, then an input image signal intermediate signal is interpolated and output as a signal interposed at a predetermined point in time between the uncleared input image signal and a preceding input image signal that precedes the uncleared input signal, in accordance with the motion vector. If the input image signal is found cleared, then the input image signal is allowed to be output unchanged as the input image signal intermediate signal.

According to the embodiments of the present invention, as outlined above, when the image signal before interpolation is cleared, the image quality of the image signal following interpolation is enhanced.

BRIEF DESCRIPTION OF THE DRAWINGS

FIG. 1 is a block diagram showing a typical structure of an ordinary image processing apparatus;

FIGS. 2A, 2B and 2C are schematic views explanatory of what ordinarily happens to the image signal following interpolation;

FIG. 3 is a block diagram showing a typical structure of a receiving apparatus practiced as a first embodiment of the present invention;

FIG. 4 is a block diagram explanatory of how interpolation is performed by the receiving apparatus of FIG. 3;

FIG. 5 is a block diagram showing a detailed structure of a frame rate converting section included in FIG. 4;

FIGS. 7A, 7B and 7C are schematic views explanatory of the image signal following interpolation;

DETAILED DESCRIPTION OF THE PREFERRED EMBODIMENTS

Figure 6C:
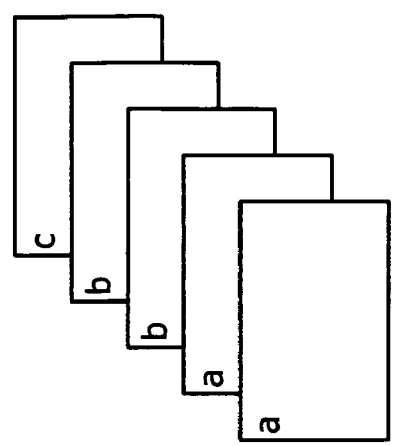
FIGS. 6A, 6B and 6C are schematic views explanatory of preliminary and usual interpolation processing.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the invention depicted hereunder has a specifically corresponding claim, this does not mean that the example in question is limited to that claim or has no relevance to other claims.

One embodiment of the present invention is an image processing apparatus (e.g., receiving apparatus 30 in FIG. 3) including: detecting means (e.g., detecting portion 92 in FIG. 5) for detecting a motion vector from an input image signal acting as the image signal for each of chronologically input pixels; determining means (e.g., MPU 31 in FIG. 4) for determining whether the input image signal is cleared; and interpolating means (e.g., mixing portion 95 in FIG. 5) for interpolating and outputting, if the input image signal is not found cleared, an input image signal intermediate signal interposed at a predetermined point in time between the uncleared input image signal and a preceding input image signal that precedes the uncleared input signal, in accordance with the motion vector; and if the input image signal is found cleared, then the interpolating means allows the input image signal to be output unchanged as the input image signal intermediate signal.

Preferably, the image processing apparatus of the embodiment of the present invention may further include image clearing means (e.g., image clearing section 11 in FIG. 4) for clearing the input image signal.

Preferably, the image processing apparatus of the embodiment of the present invention may further include receiving means (e.g., input unit 38 in FIG. 3) for receiving a predetermined command (e.g., channel change command or input change command); wherein, if the predetermined command is received, then the determining means may determine that the input image signal is cleared; and wherein, if the predetermined command is received, then the image clearing means may clear the input image signal.

Preferably, the image processing apparatus of the embodiment of the present invention may further include acquiring means (e.g., communication unit 213 in FIG. 16) for acquiring an image clear signal which is input from another apparatus (e.g., recording and reproducing apparatus 202 in FIG. 15) and which indicates that the input image signal is cleared; wherein the input image signal may be input from that another apparatus; and wherein the determining means may determine whether the input image signal is cleared in accordance with the image clear signal.

Another embodiment of the present invention is an image processing method for use with an image processing apparatus (e.g., receiving apparatus 30 in FIG. 3) for interpolating an input image signal acting as the image signal for each of chronologically input pixels, the image processing method including the steps of: detecting (e.g., in step S53 of FIG. 10) a motion vector from the input image signal; determining (e.g., in step S55 of FIG. 10) whether the input image signal is cleared; if the input image signal is not found cleared, then interpolating and outputting (e.g., in step S58 of FIG. 10) an input image signal intermediate signal interposed at a predetermined point in time between the uncleared input image signal and a preceding input image signal that precedes the uncleared input signal, in accordance with the motion vector; and if the input image signal is found cleared, then allowing (e.g., in step S60 of FIG. 10) the input image signal to be output unchanged as the input image signal intermediate signal.

Some preferred embodiments of the present invention will now be described in detail with reference to the accompanying drawings.

FIG. 3 schematically shows a typical structure of the receiving apparatus practiced as the first embodiment of the present invention.

The receiving apparatus 30 in FIG. 3 includes an MPU (micro processing unit) 31, a tuner 32, a decode processing unit 33, a signal processing unit 34 connected to a display unit 35 and a speaker 36, an input unit 38, a communication unit 39, a recording unit 40, and a drive 41, all interconnected via a bus 37. In operation, the receiving apparatus 30 receives radio waves of digital signals representative of the pixels of chronologically ordered frame-by-frame images of TV programs as well as digital signals of sounds accompanying the images, and outputs the images and sounds of the received TV programs (the digital signals may be called the program signals hereunder).

The MPU 31 performs various processes in response to commands entered through the input unit 38, by executing programs that are installed illustratively in the recording unit 40. For example, given a channel change command, the MPU 31 controls the tuner 32 to change to the channel corresponding to the program signal to be received. Given an input change command, the MPU 31 causes the input source of the program signal being input to the decode processing unit 33 to be switched from the tuner 32 to an external apparatus (not shown) connected to the communication unit 39, or vice versa.

In response to the input change command or channel change command, the MPU 31 further supplies the signal processing unit 34 with an image clear command signal and an image clear signal indicating that the image signal is cleared. Given an OSD image display start command, the MPU 31 feeds a multiplex command signal to the signal processing unit 34.

As needed, the MPU 31 installs into the recording unit 40 the programs downloaded through the communication unit 39 or the programs that are held on a removable medium 42 such as a magnetic disk, an optical disk or semiconductor memory. The removable medium 42 is attached to and driven by the drive 41 for program installation.

Under control of the MPU 31, the tuner 32 receives and demodulates the radio waves which carry the program signal of a user-designated TV channel and which are emitted by a broadcasting station, not shown. Following demodulation, the tuner 32 supplies the resulting program signal to the decode processing unit 33.

Under control of the MPU 31, the decode processing unit 33 decodes the encoded program signal coming from the tuner 32, in accordance with an appropriate standard such as MPEG-2 (Moving Picture Experts Group Phase 2). The decoded program signal is forwarded to the signal processing unit 34.

The signal processing unit 34 is made up of an image processing block 51 and an audio processing block 52. In response to an image clear command signal coming from the MPU 31, the image processing block 51 clears the image signal derived from the program signal supplied by the decode processing unit 33. Given a multiplex command signal, the image processing block 51 multiplexes the image signal with an OSD image signal. The image signal resulting from the image clear operation or from the multiplexing operation is subjected by the image processing block 51 to such processes as interpolation and D/A conversion. The interpolation involves having an image signal interposed chronologically between two consecutive image signals. The image processing block 51 supplies the display unit 35 with the image signal that is an analog signal resulting from the preceding processes. The display unit 35 in turn displays images based on the received image signal.

The audio processing block 52 performs D/A conversion on the audio signal derived from the program signal supplied by the decode processing unit 33. The resulting audio signal in analog form is fed to the speaker 36 for audio output to the outside.

The input unit 38 is illustratively made up of buttons, a keyboard, a mouse, switches, and a receiving block that receives commands sent from a remote controller, not shown. In operation, the input unit 38 receives commands from the user and gives various signals based on the commands to the MPU 31 via the bus 37.

Illustratively, in response to a channel change command or an input change command from the user, the input unit 38 supplies the MPU 31 with a channel change signal or an input change signal, respectively. Given an OSD image display start command or an OSD image display stop command from the user, the input unit 38 supplies the MPU 31 with an OSD image display start signal or an OSD image display stop signal, respectively.

The communication unit 39 sends and receives diverse kinds of data over a network such as the Internet, not shown. Furthermore, the communication unit 39 downloads suitable programs illustratively from a server, not shown, over the network and feeds the downloaded programs to the MPU 31. The recording unit 40 records the programs and/or data to be executed and/or operated on by the MPU 31 as needed.

A removable medium 42 is loaded as needed into the drive 41. The drive 41 drives the loaded medium, retrieves programs or data from the medium being driven, and sends what has been retrieved to the MPU 31 over the bus 37.

Described below with reference to FIG. 4 is how interpolation is performed by the receiving apparatus 30 in FIG. 3.

Of the reference numerals used in FIG. 4, those already found in FIG. 1 designate like or corresponding parts, and their descriptions will be omitted where redundant.

As shown in FIG. 4, in response to an input change command or a channel change command entered from the input unit 38, the MPU 31 feeds an image clear command signal to the image clearing section 11 in the image processing block 51 and an image clear signal to the frame rate converting section 61. Given an OSD image display start command from the input unit 38, the MPU 31 sends a multiplex command signal to the OSD multiplexing section 12 in the image processing block 51.

The image processing block 51 is constituted by the image clearing section 11, OSD multiplexing section 12, and frame rate converting section 61. The display unit 35 is formed by the panel driving section 14 and display panel 15.

The image signal derived from the program signal coming from the decode processing unit 33 is input to the image clearing section 11 in the image processing block 51 as an input image signal.

The frame rate converting section 61 converts the frame rate of the input image signal by interpolating the input image signal coming from the OSD multiplexing section 12 in accordance with the image clear signal supplied by the MPU 31. The frame rate converting section 61 sends the interpolated input image signal to the panel driving section 14 of the display unit 35 so that frame-by-frame images are displayed by the display panel 15. The frame rate converting section 61 will be discussed later in more detail with reference to FIG. 5.

FIG. 5 schematically shows a detailed structure of the frame rate converting section 61 in FIG. 4.

As shown in FIG. 5, the frame rate converting section 61 is made up of a frame memory 91, a detecting portion 92, a moving portion 93, a determining portion 94, a mixing portion 95, and a selecting portion 96.

An input image signal coming from the OSD multiplexing section 12 in FIG. 4 is fed to the frame memory 91, detecting portion 92, mixing portion 95, and selecting portion 96. An image clear signal supplied by the MPU 31 is sent to the determining portion 94.

The frame memory 91 stores input image signals coming from the OSD multiplexing section 12 on a frame-by-frame basis. In operation, the frame memory 91 reads the previously stored input image signal, i.e., the input image signal one frame interval earlier than the input image signal coming from the OSD multiplexing section 12. The retrieved input image signal is supplied to the detecting portion 92, moving portion 93, and mixing portion 95.

The detecting portion 92 regards the input image signal coming from the OSD multiplexing section 12 as the target input image signal to be detected (called the target input image signal hereunder). The detecting portion 92 proceeds to detect a motion vector from the target input image signal based both on the target input image signal and on the input image signal one frame interval earlier (called the preceding input image signal hereunder) than the target input image signal supplied by the frame memory 91.

Illustratively, using the block matching method, the detecting portion 92 detects a block-by-block motion vector by matching a base block set for the target input image signal with a reference block which is the same in size as the base block and which is set for the preceding input image signal. Following the detection, the detecting portion 92 feeds the block-by-block motion vector to the moving portion 93 and determining portion 94.

The moving portion 93 moves the preceding input image signal coming from the frame memory 91 on a block-by-block basis through the use of the block-by-block motion vector supplied by the detecting portion 92. The preceding input image signal thus moved is sent to the mixing portion 95.

The determining portion 94 determines the degree of confidence of the block-by-block motion vector based on the motion vector value given by the detecting portion 92. Alternatively, the confidence of the block-by-block motion vector may be determined not on the basis of its value but based on the block-by-block integral of the differences between corresponding pixels in the base block and reference block used for the calculation of the motion vector.

If an image clear signal is input from the MPU 31 in FIG. 4, the determining portion 94 supplies the mixing portion 95 with no-mix information indicating that mixing will not be performed. If the image clear signal is not input, then the determining portion 94 determines the ratio at which to mix the target input image signal with the moved preceding input image signal on a block-by-block basis (the ratio will be called the mixing ratio hereunder), in accordance with the block-by-block degree of confidence. Thereafter, the determining portion 94 supplies the block-by-block mixing ratio to the mixing portion 95.

Based on the mixing ratio from the determining portion 94, the mixing portion 95 mixes the target input image signal supplied by the OSD multiplexing section 12 with the moved preceding input image signal given by the moving portion 93. The mixing portion 95 proceeds to supply the selecting portion 96 with the mixed image signal as an interpolation signal interpolating an image signal interposed chronologically between the target input image signal and the preceding input image signal.

As described, when the mixing ratio is determined by the determining portion 94, the mixing portion 95 provides interpolation based on the determined mixing ratio by mixing the target input image signal with the preceding input image signal moved by the moving portion 93 using the motion vector. That is, where the image clear signal is not input, the frame rate converting section 61 performs the usual interpolation process involving interpolation of image signals by use of motion vectors.

Given the no-mix information from the determining portion 94, the mixing portion 95 allows the preceding input image signal coming from the frame memory 91 to be output unchanged as the interpolation signal destined for the selecting portion 96. That is, where the image clear signal is input, the frame rate converting section 61 performs a preliminary interpolation process causing the preceding input image signal to be used as the interpolation signal without modification.

As described, where the motion vector is highly likely to be erroneously detected because the target input image signal is being cleared, the frame rate converting section 61 does not perform interpolation based on the motion vector. In that case, the preceding input image signal is used unchanged as the interpolation signal. This makes it possible to prevent the generation of an inaccurate interpolation signal and to output the image signal having undergone stable interpolation.

The selecting portion 96 selects either the target input image signal supplied by the OSD multiplexing section 12 or the interpolation signal coming from the mixing portion 95, and outputs the selected signal as the interpolated image signal in a suitably timed manner. More specifically, between the target input image signal and another target input image signal that follows it, the selecting portion 96 creates an interpolation signal using the two signals and outputs the created signal as the interpolated image signal. As a result, the frame rate of the interpolated image signal output by the selecting portion 96 becomes twice as high as the frame rate of the input image signal.

Figure 6B:
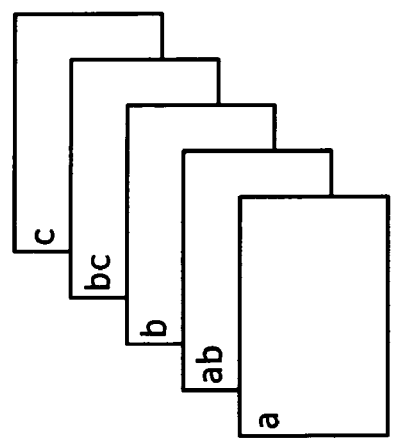
Figure 6A:
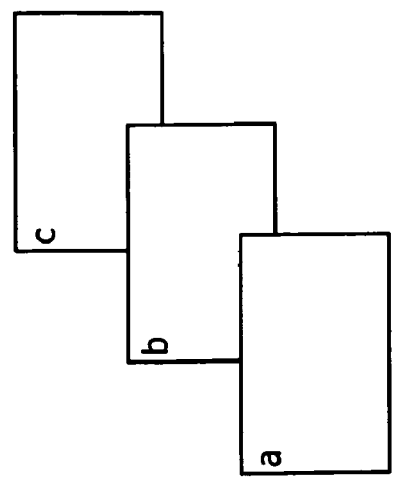

Described below with reference to FIGS. 6A through 6C is how the frame rate converting section 61 carries out preliminary and usual interpolation processing.

As shown in FIG. 6A, it is assumed that three consecutive frames are represented by input image signals a, b and c which are input successively to the frame rate converting section 61.

In usual interpolation, if the input image signal b is regarded as the target input image signal, then the mixing ratio corresponding to the motion vector of the input image signal b is used to mix the input image signal b as the target input image signal with the input image signal a as the preceding input image signal moved as per the motion vector. This creates an interpolation signal ab interposed chronologically between the input image signal a and the input image signal b, as shown in FIG. 6B. Likewise, if the input image signal c is considered the target input image signal, then the mixing ratio corresponding to the motion vector of the input image signal c is used to create an interpolation signal bc that is interposed chronologically between the input image signal b and the input image signal c, as shown in FIG. 6B.

On the other hand, in preliminary interpolation, if the input image signal b is regarded as the target input image signal, then the input image signal a as the preceding input image signal is allowed to become the interpolation signal without modification, as shown in FIG. 6C. Likewise, if the input image signal c is considered the target input image signal, then the input image signal b as the preceding input image signal is used unmodified as the interpolation signal, as shown in FIG. 6C.

Described below with reference to FIGS. 7A through 7C is how an interpolated image signal is output by the selecting portion 96 in FIG. 5. Of the reference numerals used in FIG. 7, those already found in FIG. 2 designate like or corresponding parts, and their descriptions will be omitted where redundant.

As shown in FIG. 7A, suppose that the frame rate converting section 61 is first supplied with an image signal representative of an uncleared image 21 having a black donut-shaped circle against a white background, followed by an image clear signal entailing the input of an image signal of an image 22. In this case, in response to the image clear signal, the frame rate converting section 61 performs preliminary interpolation by regarding the image signal of the image 22 as the target input image signal. Between the image signal of the image 21 and that of the image 22, the frame rate converting section 61 outputs as the interpolated image signal an image signal of an image 100 identical to the image signal of the image 21 acting as the preceding input image signal, as shown in FIG. 7B.

As a result, as illustrated in FIG. 7B, the same image as the image 21 stays displayed immediately up until the cleared image 22 is displayed. This prevents deterioration of the image quality immediately before the image 22.

Suppose now that as shown in FIG. 7C, the frame rate converting section 61 is supplied with the image signal of an image 101 multiplexed with the image signal of an OSD image 101A (MENU), followed by an image signal 102 resulting from an input image clear signal entailing the cleared image 22 multiplexed with the image signal of the OSD image 101A. In such a case, in response to the image clear signal, the frame rate converting section 61 performs preliminary interpolation with the image signal of the image 102 regarded as the target input image signal.

Following the interpolation, as shown in FIG. 7C, an image 103 identical to the image 101 is displayed between the image 101 and the image 102. This prevents deterioration of the image quality immediately before the image 102.

Figure 8:
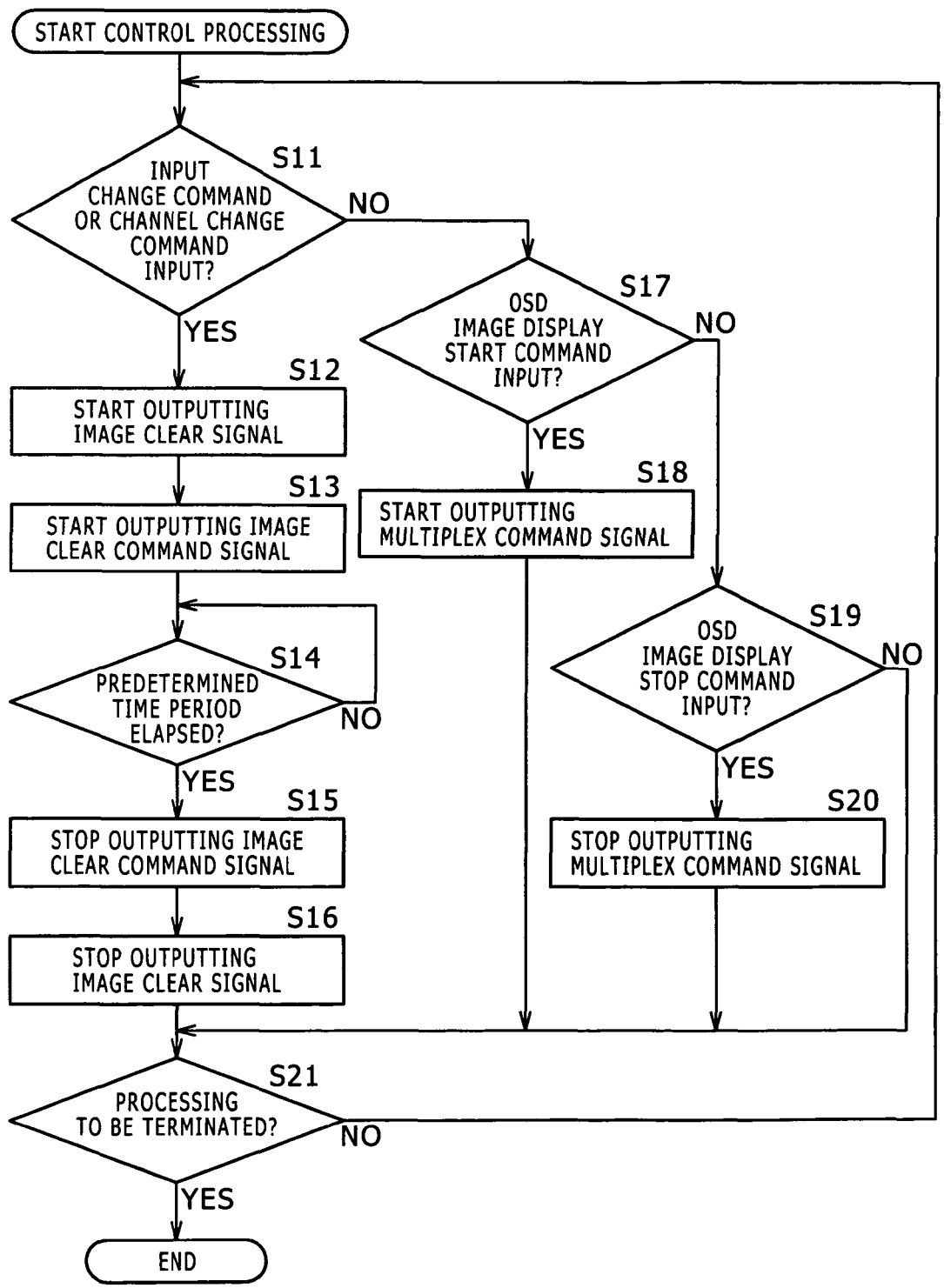
FIG. 8 is a flowchart of steps constituting control processing performed by an MPU included in FIG. 3.

Described below with reference to FIG. 8 is typical control processing carried out by the MPU 31 in FIG. 3. The processing is started illustratively when the receiving apparatus 30 is switched on.

In step S11 of FIG. 8, the MPU 31 checks to determine whether an input change command or a channel change command is input from the input unit 38. If the input change command or channel change command is found input from the input unit 38, then step S12 is reached. In step S12, the MPU 31 determines that the input image signal is being cleared and starts outputting an image clear signal to the frame rate converting section 61. In step S13, the MPU 31 starts outputting an image clear command signal to the image clearing section 11.

When the MPU 31 outputs the image clear signal before the image clear command signal, the frame rate converting section 61 can switch its frame interpolation processing from usual interpolation to preliminary interpolation before the image clearing section 11 performs an image-clearing operation based on the image clear command signal. As a result, the frame rate converting section 61 can unfailingly perform its frame interpolation processing in the form of preliminary interpolation with regard to the target input image signal being cleared.

In step S14, the MPU 31 checks to determine whether a predetermined time period has elapsed since the output of the image clear command signal was started in step S13. Illustratively, this time period is equal to a maximum period of time in which image distortion can result from an input change or a channel change.

If in step S14 the predetermined time period is not found to have elapsed, then the MPU 31 waits for the time to pass. When the predetermined time period is found to have elapsed in step S14, step S15 is reached. In step S15, the MPU 31 stops outputting the image clear command signal to the image clearing section 11. As described, the MPU 31 keeps outputting the image clear command signal to the image clearing section 11 in order to clear the input image signal during the maximum time period in which image distortion can take place. This prevents the display of a distorted image on the display panel 15.

In step S16, the MPU 31 stops outputting the image clear signal to the frame rate converting section 61. Control is then passed on to step S21.

If in step S11 the input change command or channel change command is not found input from the input unit 38, then step S17 is reached. In step S17, the MPU 31 checks to determine whether an OSD image display start command is input from the input unit 38. If in step S17 the OSD image display start command is found input, then step S18 is reached. In step S18, the MPU 31 starts outputting a multiplex command signal to the OSD multiplexing section 12. Control is then passed on to step S21.

If in step S17 the OSD image display start command is not found input from the input unit 38, then step S19 is reached. In step S19, the MPU 31 checks to determine whether an OSD image display stop command is input. If in step S19 the OSD image display stop command is found input, then step S20 is reached. In step S20, the MPU 31 stops outputting the multiplex command signal to the OSD multiplexing section 12. Control is then transferred to step S21.

If in step S19 the OSD image display stop command is not found input, then step S21 is reached.

In step S21, the MPU 31 checks to determine whether control processing is designated to be terminated. For example, a check is made to determine if a power-off command is input from the input unit 38. If it is determined in step S21 that control processing has yet to be terminated, then control is returned to step S11 and the subsequent steps are repeated. If in step S21 the MPU 31 determines that control processing is designated to be terminated, then the processing is brought to an end.

In the foregoing description, the MPU 31 was shown to output the image clear command signal following the output of the image clear signal. Alternatively, if the OSD multiplexing section 12 can start multiplexing the OSD image signal based on the image clear command signal after the frame rate converting section 61 switched its frame interpolation processing to preliminary interpolation in response to the image clear signal, then the image clear command signal can be sent before the output of the image clear signal.

In the foregoing description, the MPU 31 was shown to start outputting the image clear command signal to the image clearing section 11 in response to the input change command or channel change command from the input unit 38. Alternatively, where the output of the multiplex command signal has been started, the output of the multiplex command signal may be stopped the moment the image clear command signal starts getting output. In this case, if an input change or a channel change takes place during the display of an OSD image, a black image without the OSD image appears during a predetermined time period.

Figure 9:
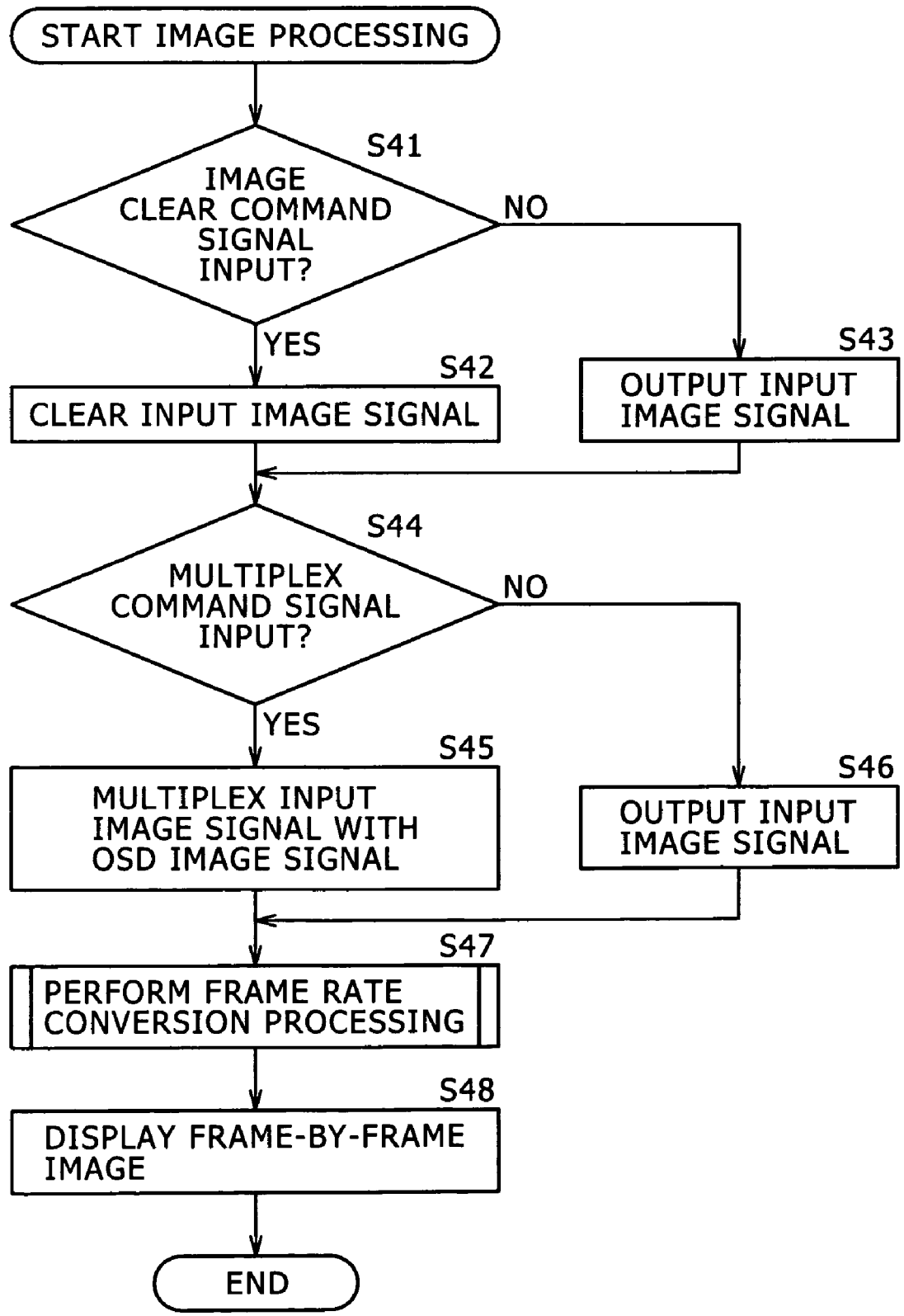
FIG. 9 is a flowchart of steps constituting image processing carried out by the receiving apparatus of FIG. 3.

Described below with reference to FIG. 9 is how image processing is carried out by the receiving apparatus 30 in FIG. 3. The processing is started illustratively when the decode processing unit 33 feeds an input image signal to the image processing block 51.

In step S41 of FIG. 9, the image clearing section 11 in the image processing block 51 checks to determine whether an image clear command signal is input from the MPU 31. If the image clear command signal is found input, step S42 is reached. In step S42, the image clearing section 11 clears the input image signal coming from the decode processing unit 33. The image clearing section 11 proceeds to feed the cleared input image signal to the OSD multiplexing section 12. Step S42 is followed by step S44.

If in step S41 the image clear command signal is not found input, then step S43 is reached. In step S43, the image clearing section 11 allows the input image signal coming from the decode processing unit 33 to be output unchanged to the OSD multiplexing section 12. Step S43 is followed by step S44.

In step S44, the OSD multiplexing section 12 checks to determine whether a multiplex command signal is input from the MPU 31. If the multiplex command signal is found input, then step S45 is reached. In step S45, the OSD multiplexing section 12 multiplexes the input image from the image clearing section 11 with an OSD image signal. The OSD multiplexing section 12 proceeds to feed the multiplexed input image signal to the frame rate converting section 61. Step S45 is followed by step S47.

If in step S44 the multiplex command signal is not found input, then step S46 is reached. In step S46, the OSD multiplexing section 12 allows the input image signal from the image clearing section 11 to be output unchanged to the frame rate converting section 61. Step S46 is followed by step S47.

In step S47, the frame rate converting section 61 performs frame rate conversion processing converting the frame rate of the input image signal supplied by the OSD multiplexing section 12. The frame rate conversion processing will be discussed later in more detail with reference to FIG. 10.

In step S48, the panel driving section 14 performs D/A conversion on the interpolated image signal coming from the frame rate converting section 61. The resulting signal in analog form is used to drive the display panel 15 whereby frame-by-frame images are displayed. This brings the image processing to an end.

Figure 10:
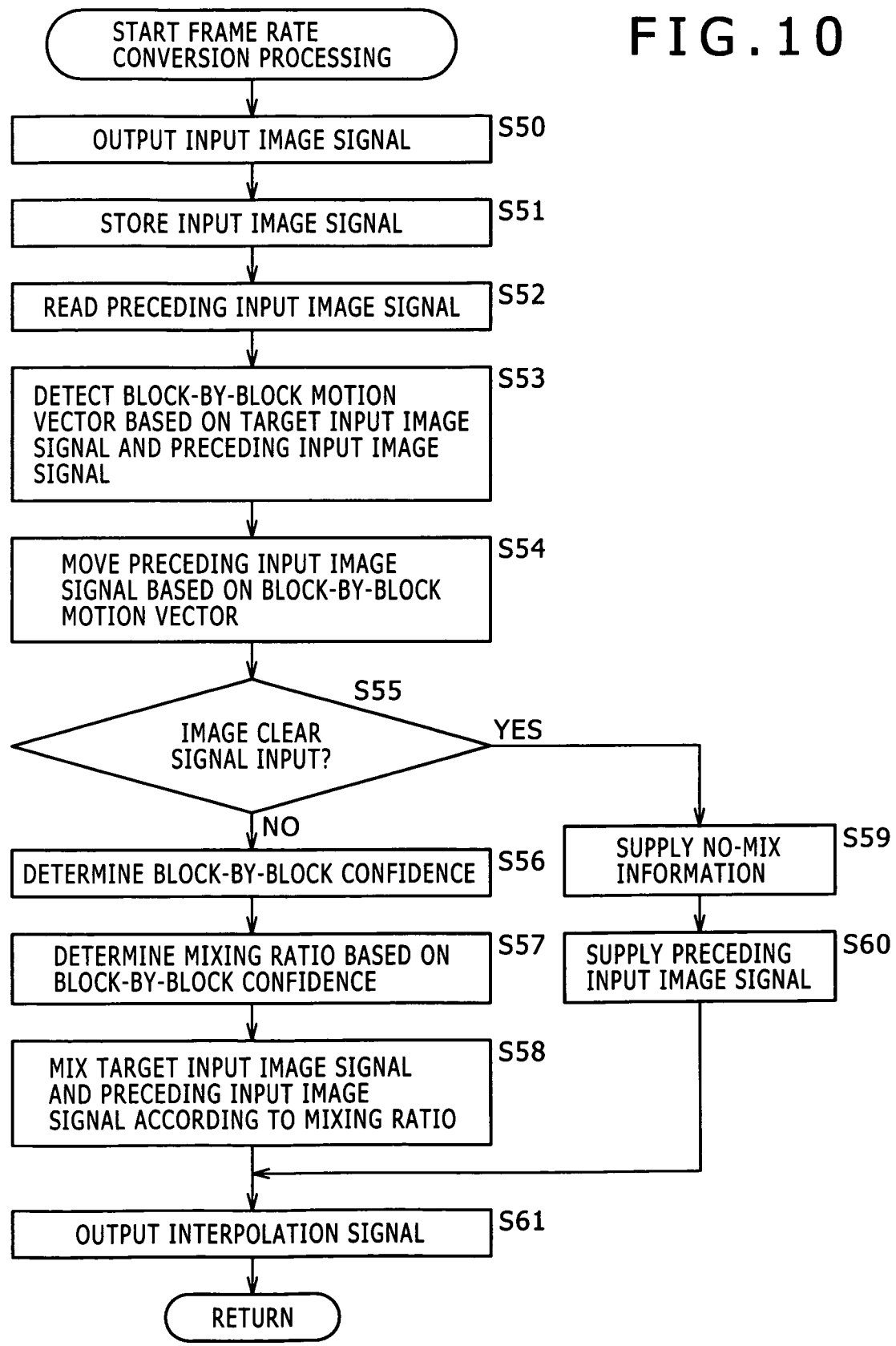
FIG. 10 is a flowchart of steps detailing the frame rate conversion processing performed in step S47 of FIG. 9.

The frame rate conversion process of step S47 in FIG. 9 will now be described in detail with reference to FIG. 10.

In step S50, the selecting portion 96 in the frame rate converting section 61 causes the input image signal coming from the OSD multiplexing section 12 to be output as the interpolated image signal. In step S51, the frame memory 91 stores the input image signal supplied by the OSD multiplexing section 12. In step S52, the frame memory 91 retrieves as the preceding input image signal the input image signal one frame interval earlier than the input image signal which was stored in step S51. The preceding input image signal thus retrieved is fed to the detecting portion 92, moving portion 93, and mixing portion 95.

In step S53, the detecting portion 92 regards the input image signal coming from the OSD multiplexing section 12 as the target input image signal, and detects a block-by-block motion vector of the target input image signal on the basis of this target input image signal and the preceding input image signal supplied by the frame memory 91. The block-by-block motion vector thus detected by the detecting portion 92 is sent to the moving portion 93 and determining portion 94.

In step S54, the moving portion 93 moves on a block-by-block basis the preceding input image signal coming from the frame memory 91 in accordance with the block-by-block motion vector supplied by the detecting portion 92. The moved preceding input image signal is forwarded to the mixing portion 95.

In step S55, the determining portion 94 checks to determine whether an image clear signal is being input from the MPU 31. If the image clear signal is not found input, then step S56 is reached. In step S56, the determining portion 94 determines the block-by-block degree of confidence based on the block-by-block motion vector supplied by the detecting portion 92.

In step S57, the determining portion 94 determines the mixing ratio based on the block-by-block degree of confidence determined in step S56. More specifically, if the block-by-block degree of confidence is high, then the determining portion 94 determines a block-by-block mixing ratio such that a high proportion of the pixels from the moved preceding input image signal is to be mixed. If the block-by-block degree of confidence is low, then the determining portion 94 determines a block-by-block mixing ratio such that a low proportion of the pixels from the moved preceding input image signal is to be mixed. The determining portion 94 sends the block-by-block mixing ratio thus determined to the mixing portion 95.

In step S58, based on the mixing ratio supplied by the determining portion 94, the mixing portion 95 mixes the target input image signal coming from the OSD multiplexing section 12 with the moved preceding input image signal supplied by the moving portion 93. The mixing portion 95 proceeds to feed the mixed image signal to the selecting portion 96 as an interpolation signal. In the manner described above, if the image clear signal is not found input from the MPU 31, then the frame rate converting section 61 performs usual interpolation.

On the other hand, if in step S55 the image clear signal is found input, then step S59 is reached. In step S59, the determining portion 94 feeds no-mix information to the mixing portion 95. In step S60, given the no-mix information from the determining portion 94, the mixing portion 95 allows the preceding input image signal from the frame memory 91 to be fed to the selecting portion 96 as the interpolation signal without modification.

As described, when the image clear signal is input from the MPU 31, the frame rate converting section 61 carries out preliminary interpolation. Whereas the target input image signal cleared of its image can give rise to inaccurate motion vector detection, the inventive arrangement prevents generation of an interpolation signal based on an incorrect motion vector and contributes to enhancing the image quality of the image signal following interpolation.

In step S61, the selecting portion 96 causes the interpolation signal coming from the mixing portion 95 to be output as the interpolated image signal. Control is then returned to step S47 in FIG. 9.

Figure 11:
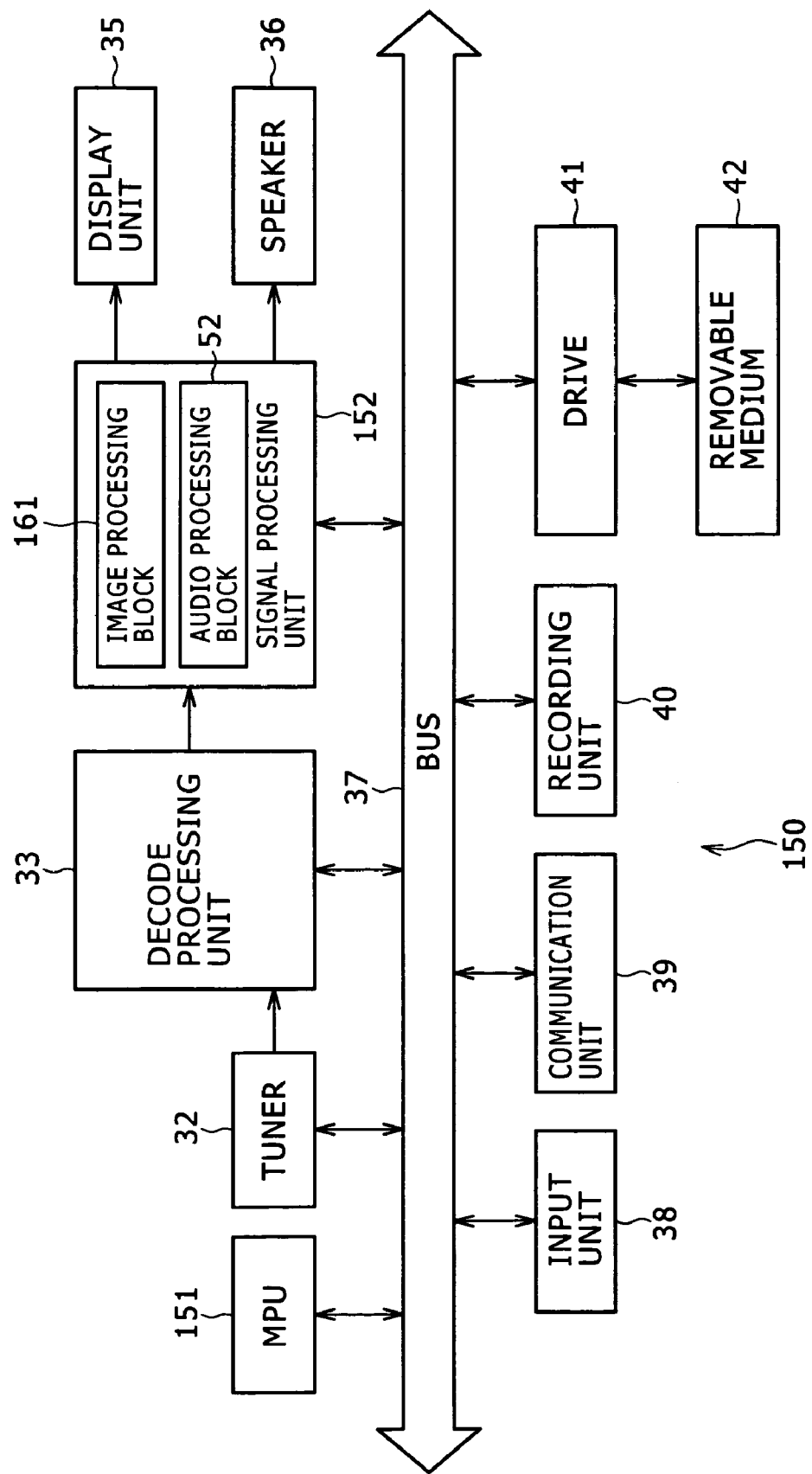
FIG. 11 is a block diagram showing a typical structure of a receiving apparatus practiced as a second embodiment of the present invention.

FIG. 11 schematically shows a typical structure of a receiving apparatus practiced as the second embodiment of the present invention.

In FIG. 11, the receiving apparatus 150 includes a tuner 32, a decode processing unit 33, an input unit 38, a communication unit 39, a recording unit 40, a drive 41, an MPU 151, and a signal processing unit 152 connected to a display unit 35 and a speaker 36, all interconnected via a bus 37. The signal processing unit 152 detects whether the input image signal coming from the decode processing unit 33 is cleared of its image. Of the reference numerals used in FIG. 11, those already found in FIG. 3 designate like or corresponding parts, and their descriptions will be omitted where redundant.

The MPU 151 performs various processes in response to commands entered through the input unit 38, by executing programs that are installed illustratively in the recording unit 40. For example, like the MPU 31 in FIG. 3, the MPU 151 receives a channel change command and controls accordingly the tuner 32 to change to the channel corresponding to the program signal to be received. Also like the MPU 31 in FIG. 3, given an input change command, the MPU 151 causes the input source of the program signal being input to the decode processing unit 33 to be switched from the tuner 32 to an external apparatus (not shown) connected to the communication unit 39, or vice versa.

In response to the input change command or channel change command, the MPU 151 further supplies the signal processing unit 152 with an image clear command signal. Given an OSD image display start command, the MPU 151 feeds a multiplex command signal to the signal processing unit 152.

Like the MPU 31 in FIG. 3, the MPU 151 as needed installs into the recording unit 40 the programs downloaded through the communication unit 39 or the programs that are held on a removable medium 42, which may be attached to and driven by the drive 41 for program installation.

The signal processing unit 152 is made up of an audio processing block 52 and an image processing block 161. Like the image processing block 51 in FIG. 3, the image processing block 161 clears the image signal derived from the program signal supplied by the decode processing unit 33, in response to an image clear command signal coming from the MPU 151. Given a multiplex command signal, the image processing block 161 multiplexes the image signal with an OSD image signal. The image processing block 161 subjects the image signal resulting from the image clear operation or from the multiplexing operation to diverse processes. One such process involves the detection of whether the resulting image signal is cleared of its image. Other processes include the interpolation having an image signal interposed chronologically between two consecutive image signals, and D/A conversion. The image processing block 161 supplies the display unit 35 with the image signal that is an analog signal resulting from such processes. The display unit 35 in turn displays images based on the received image signal.

Figure 12:
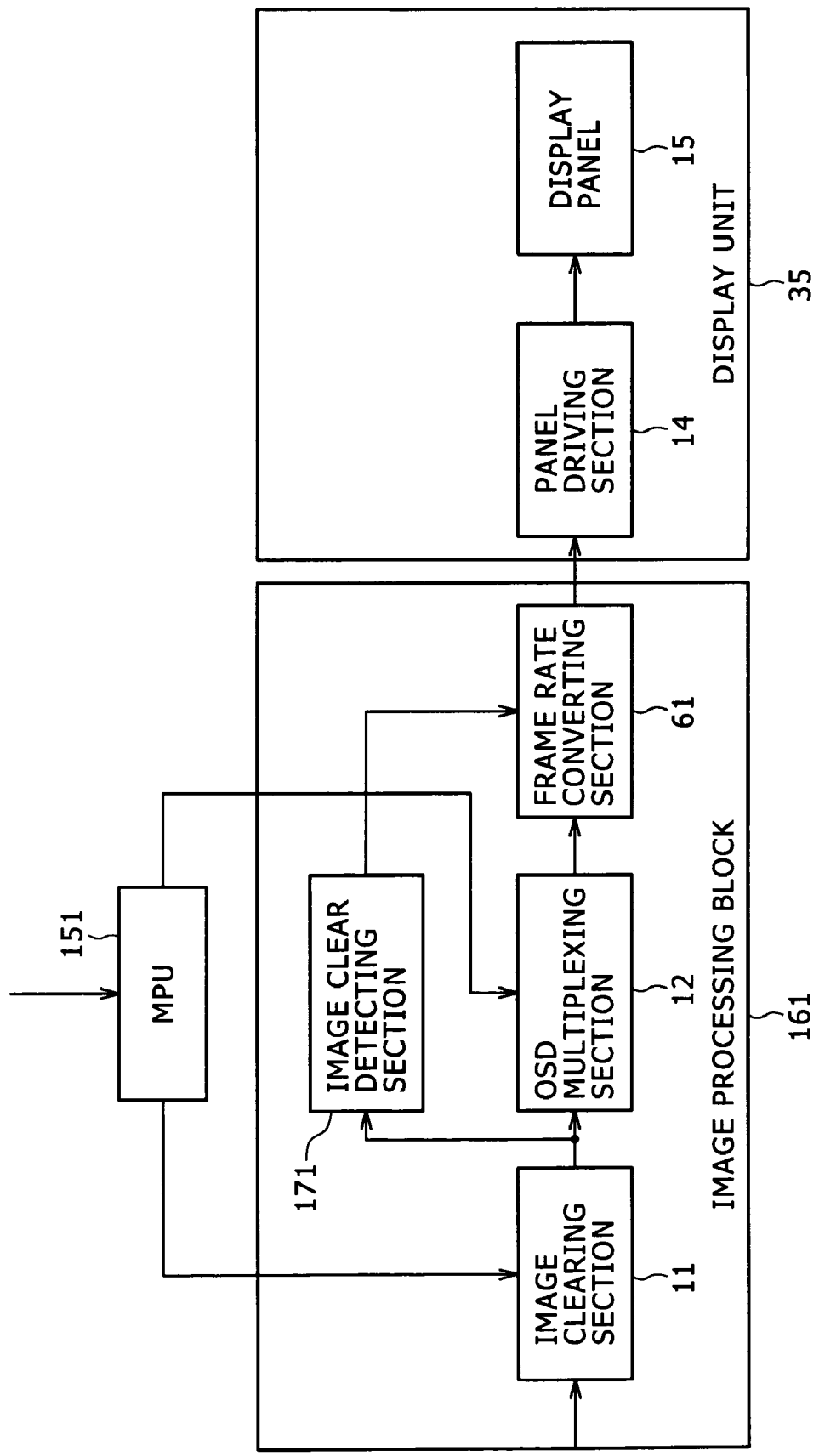
FIG. 12 is a block diagram explanatory of how interpolation is performed by the receiving apparatus of FIG. 11.

Described below with reference to FIG. 12 is how interpolation is performed by the receiving apparatus 150 in FIG. 11.

Of the reference numerals used in FIG. 12, those already found in FIGS. 1 and 4 designate like or corresponding parts, and their descriptions will be omitted where redundant.

As shown in FIG. 12, in response to an input change command or a channel change command coming from the input unit 38, the MPU 151 feeds an image clear command signal to the image clearing section 11 in the image processing block 161. Like the MPU 31 in FIG. 3, the MPU 151 sends a multiplex command signal to the OSD multiplexing section 12 in the image processing block 161 in response to an OSD image display start command coming from the input unit 38.

The image processing block 161 is constituted by the image clearing section 11, OSD multiplexing section 12, frame rate converting section 61, and an image clear detecting section 171. The display unit 35 is formed by the panel driving section 14 and display panel 15.

In the image processing block 161 of FIG. 12, the input image signal output by the image clearing section 11 is input not only to the OSD multiplexing section 12 but also to the image clear detecting section 171. Given the input image signal from the image clearing section 11, the image clear detecting section 171 detects whether the input image signal in question is cleared of its image. If the input image signal is found cleared of its image, then the image clear detecting section 171 supplies an image clear signal for the input image signal in question to the determining portion 94 (FIG. 5) in the frame rate converting section 61.

Figure 13:
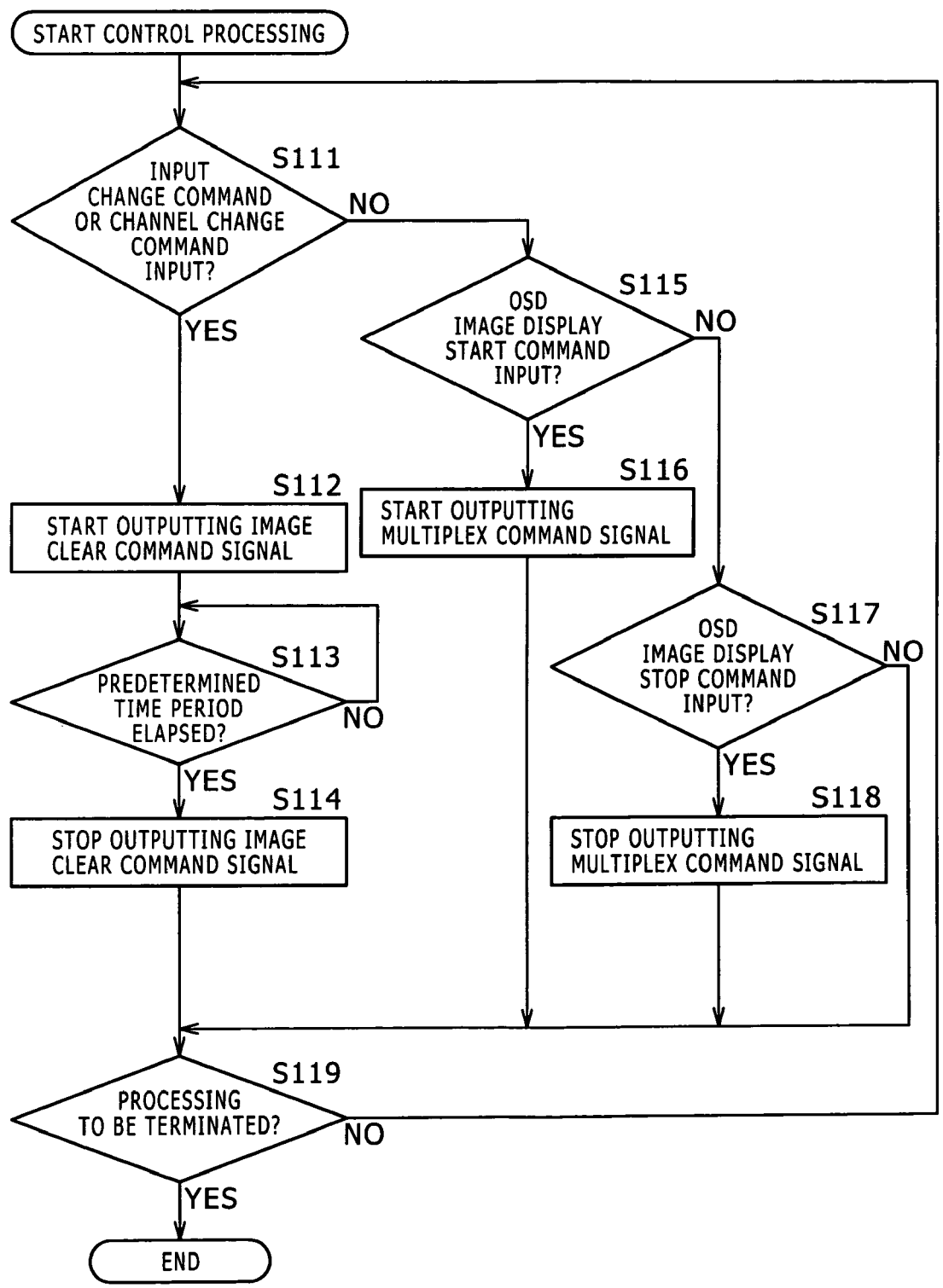
FIG. 13 is a flowchart of steps constituting control processing carried out by an MPU included in FIG. 11.

Described below with reference to FIG. 13 is how control processing is performed by the MPU 151 in FIG. 11. The control processing is started illustratively when the receiving apparatus 150 is switched on.

Steps S111 through S119 in FIG. 13 constitute the same processing as that shown in FIG. 8 except for steps S12 and S16. That is, in the course of the control processing shown in FIG. 13, the MPU 151 does not output any image clear signal.

The detection processing performed by the image clear detecting section 171 in FIG. 12 is described below in reference to FIG. 14. The detection processing is started illustratively when the image clearing section 11 inputs an input image signal to the image clear detecting section 171.

Figure 14:
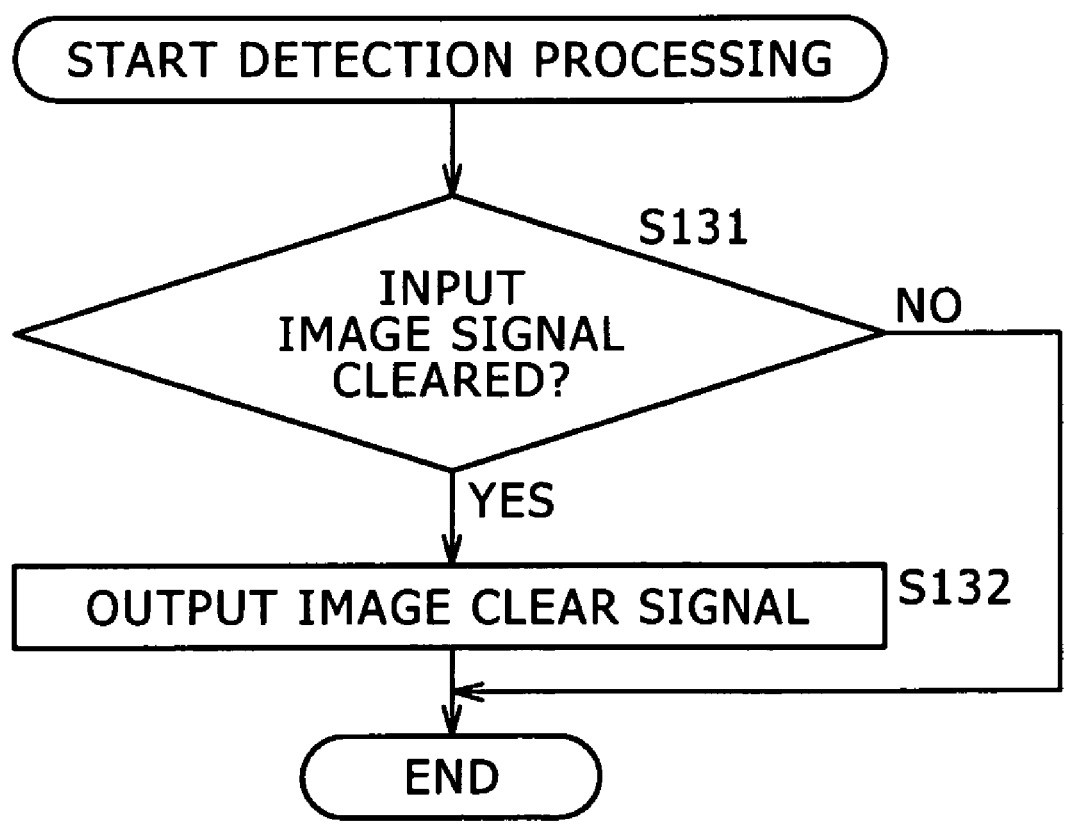
FIG. 14 is a flowchart of steps constituting detection processing executed by an image clear detecting section included in FIG. 12.

In step S131 of FIG. 14, the image clear detecting section 171 checks to determine whether the input image signal is cleared of its image. More specifically, the image clear detecting section 171 determines whether the input image signal is cleared based on a histogram (frequency distribution) of levels in the input image signal, on the number of pixels for which the input image signal is at the black level, and on chronological changes of input image signal levels representative of how much two consecutive input image signal levels coincide with each other.

If in step S131 the input image signal is found cleared of its image, then step S132 is reached. In step S132, the image clear detecting section 171 outputs an image clear signal for the input image signal in question and terminates the detection processing. If in step S131 the input image signal is not found cleared, then step S132 is skipped and the detection processing is brought to an end.

The image processing performed by the receiving apparatus 150 in FIG. 11 is the same as the image processing shown in FIG. 9 and thus will not be discussed further. It should be noted that in the image processing by the receiving apparatus 150, step S55 shown in FIG. 10 as part of the frame rate conversion processing of step S47 involves checking to determine whether the image clear signal for the target input image signal is input from the image clear detecting section 171.

More specifically, the image clear signal output in step S132 of FIG. 14 with regard to a given input image signal is typically furnished with information (e.g., frame number) for identifying the input image signal in question. The determining portion 94 checks to determine whether the image clear signal is input supplemented with the information for identifying the target input image signal.

Figure 15:
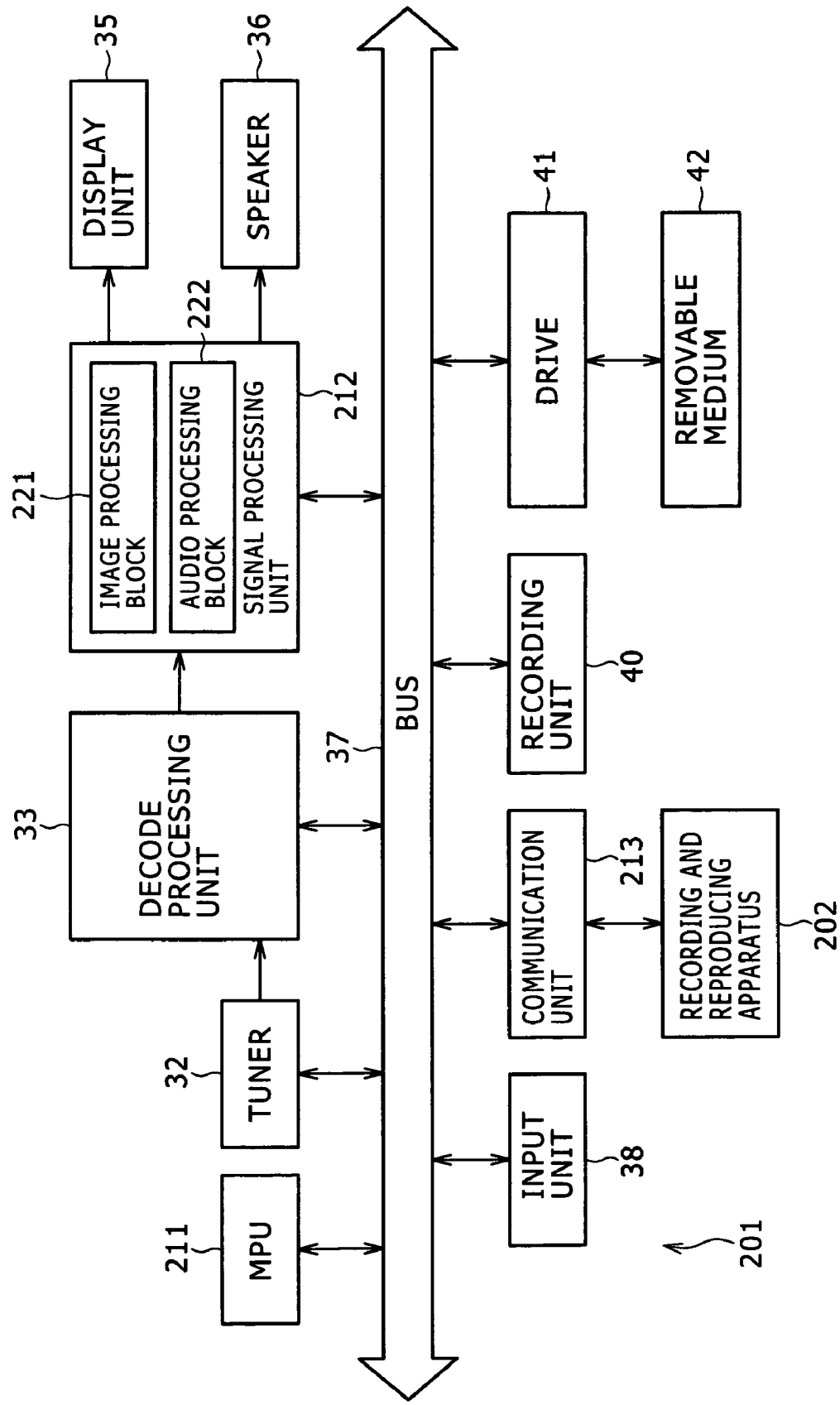
FIG. 15 is a block diagram showing a typical structure of a receiving apparatus practiced as a third embodiment of the present invention.

FIG. 15 schematically shows a typical structure of a receiving apparatus practiced as the third embodiment of the present invention.

In FIG. 15, the receiving apparatus 201 includes a tuner 32, a decode processing unit 33, an input unit 38, a recording unit 40, a drive 41, an MPU 211, a signal processing unit 212 connected to a display unit 35 and a speaker 36, and a communication unit 213, all interconnected via a bus 37. An image signal cleared of its image is input as needed from an external recording and reproducing apparatus 202 connected to the communication unit 213. Of the reference numerals used in FIG. 15, those already found in FIGS. 3 and 11 designate like or corresponding parts, and their descriptions will be omitted where redundant.

The MPU 211 performs various processes in response to commands entered through the input unit 38, by executing programs that are installed illustratively in the recording unit 40. For example, like the MPU 31 in FIG. 3 or the MPU 151 in FIG. 11, the MPU 211 receives a channel change command and controls accordingly the tuner 32 to change to the channel corresponding to the program signal to be received. Given an input change command, the MPU 211 causes the input source of the program signal being input to the decode processing unit 33 to be switched from the tuner 32 to the recording and reproducing apparatus 202 connected to the communication unit 213, or vice versa.

Like the MPU 31 in FIG. 3, in response to the input change command or channel change command, the MPU 211 further supplies the signal processing unit 212 with an image clear command signal and an image clear signal. Given an OSD image display start command, the MPU 211 feeds a multiplex command signal to the signal processing unit 212. The MPU 211 also forwards the image clear signal coming from the communication unit 213 to the signal processing unit 212.

Like the MPU 31 in FIG. 3 or the MPU 151 in FIG. 11, the MPU 211 as needed installs into the recording unit 40 the programs downloaded through the communication unit 213 or the programs that are held on a removable medium 42, which may be attached to and driven by the drive 41 for program installation.

The signal processing unit 212 is made up of an image processing block 221 and an audio processing block 222. In response to an image clear command signal coming from the MPU 211, the image processing block 221 clears the image signal derived from the program signal supplied by the decode processing unit 33 or by the communication unit 213. Given a multiplex command signal, the image processing block 221 multiplexes the image signal with an OSD image signal. Like the image processing block 51 in FIG. 3, the image processing block 221 subjects the image signal resulting from the image clear operation or from the multiplexing operation to such processes as interpolation and D/A conversion. The interpolation involves having an image signal interposed chronologically between two consecutive image signals. Like the image processing block 51 in FIG. 3 or the image processing block 161 in FIG. 11, the image processing block 221 supplies the display unit 35 with the image signal that is an analog signal resulting from the preceding processes. The display unit 35 in turn displays images based on the received image signal.

The audio processing block 222 performs D/A conversion on the audio signal derived from the program signal supplied by the decode processing unit 33 or by the communication unit 213. The resulting audio signal in analog form is fed to the speaker 36 for audio output to the outside.

The communication unit 213 is connected to the external recording and reproducing apparatus 202 for communication therewith. For example, the communication unit 213 acquires an image clear signal from the recording and reproducing apparatus 202 and forwards the acquired signal to the MPU 211 through the bus 37. The communication unit 213 receives the program signal from the recording and reproducing apparatus 202 and sends the received signal to the signal processing unit 212 via the bus 37. Like the communication unit 39 in FIG. 3 or 11, the communication unit 213 also sends and receives various kinds of data over a network such as the Internet, not shown. Furthermore, the communication unit 213 downloads relevant programs from a server, not shown, on the network and supplies the downloaded programs to the MPU 211.

The recording and reproducing apparatus 202 is typically composed of a DVD (digital versatile disc) recorder or a hard disc recorder. In operation, the recording and reproducing apparatus 202 receives the radio waves of the program signal representative of a user-designated channel and records the received program signal to the recording medium such as a DVD or a hard disk. Given a reproduction command from the user, the recording and reproducing apparatus 202 reproduces the recorded program signal and sends the reproduced signal to the communication unit 213.

In response to a reproduction target change command from the user, the recording and reproducing apparatus 202 sends an image clear signal to the communication unit 213. After sending the image clear signal, the recording and reproducing apparatus 202 clears the image signal derived from the reproduced program signal and sends the resulting program signal to the communication unit 213.

Figure 16:
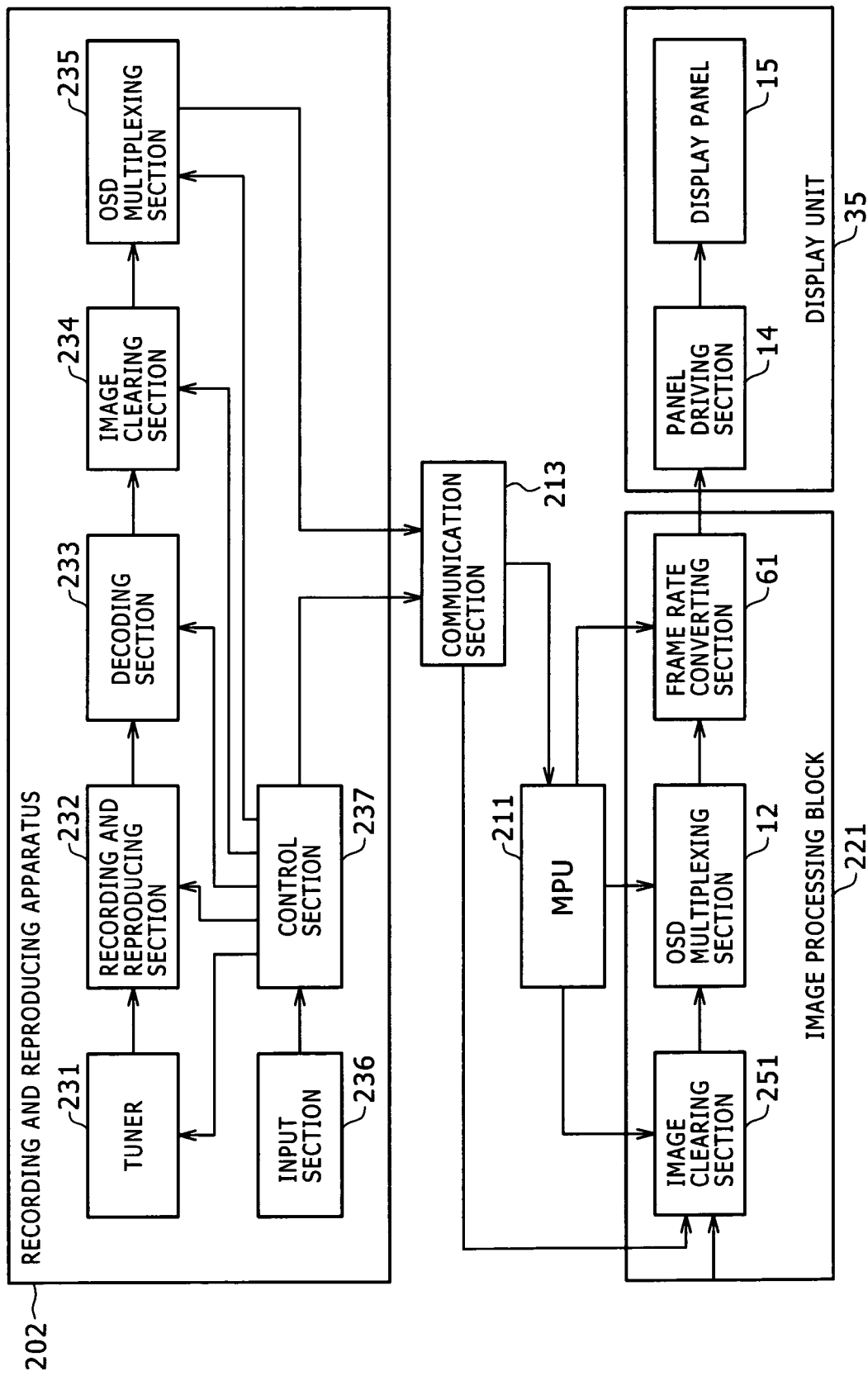
FIG. 16 is a block diagram explanatory of how interpolation is performed by the receiving apparatus of FIG. 15.

Described below with reference to FIG. 16 is how interpolation is performed by the receiving apparatus 201 in FIG. 15.

Of the reference numerals used in FIG. 16, those already found in FIGS. 4 and 12 designate like or corresponding parts, and their descriptions will be omitted where redundant.

In FIG. 16, the recording and reproducing apparatus 202 is made up of a tuner 231, a recording and reproducing section 232, a decoding section 233, an image clearing section 234, an OSD multiplexing section 235, an input section 236, and a control section 237.

Under control of the control section 237, the tuner 231 receives and demodulates the radio waves of the program signal representative of a user-designated channel, the radio waves being emitted by a broadcasting station, not shown. The tuner 231 supplies the program signal resulting from the demodulation to the recording and reproducing section 232 whereby the program signal is recorded.

The recording and reproducing section 232 records the program signal coming from the tuner 231 to the attached removable medium such as a DVD or to the internal recording medium such as a hard disk, not shown. Under control of the control section 237, the recording and reproducing section 232 reproduces the recorded program signal and feeds the reproduced signal to the decoding section 233.

The decoding section 233 under control of the control section 237 decodes the program signal supplied by the recording and reproducing section 232 in accordance with an appropriate standard. The resulting program signal is fed to the image clearing section 234.

Given an image clear command signal from the control section 237, the image clearing section 234 clears the image signal derived from the program signal supplied by the decoding section 233. The image clearing section 234 proceeds to supply the OSD multiplexing section 235 with the image signal cleared of its image or with the program signal having the image signal left intact as supplied by the decoding section 233.

In response to a multiplex command signal representative of a multiplex command from the control section 237, the OSD multiplexing section 235 multiplexes an OSD image signal with the image signal derived from the program signal supplied by the image clearing section 234. The multiplexed image signal or the program signal with the image signal left intact as supplied by the image clearing section 234 is sent by the OSD multiplexing section 235 to the communication unit 213 of the receiving apparatus 201 illustratively through a SCART (Syndicat des Constructeurs d'Appareils Radioré-cepteurs et Téléviseurs) terminal communication arrangement or by means of HDMI (High-Definition Multimedia Interface) communication.

The input section 236 is illustratively made up of buttons, a keyboard, a mouse, switches, and a receiving portion that receives commands sent from a remote controller, not shown. In operation, the input section 236 receives commands from the user and gives the control section 237 various signals based on the received commands.

Illustratively, in response to a user-designated command to record or reproduce the program of a desired channel, the input section 236 supplies the control section 237 with a command signal for recording or reproducing the program in question accordingly. Given a reproduction target change command from the user, the input section 236 supplies the control section 237 with a command signal for changing the target to be reproduced. Furthermore, upon receipt of an OSD image display start command or an OSD image display stop command from the user, the input section 236 supplies the control section 237 with a command signal for starting or stopping the OSD image display accordingly.

In response to the commands coming from the input section 236, the control section 237 carries out various processes. For example, given the command to record the program of a desired channel, the control section 237 controls the tuner 231 to receive the relevant program signal and record the received signal to the recording and reproducing section 232. Upon receipt of the command to reproduce the program of a desired channel, the control section 237 controls the recording and reproducing section 232 and the decoding section 233 to reproduce the relevant program signal from the recording and reproducing section 232.

In response to a reproduction target change command, the control section 237 controls the recording and reproducing section 232 and the decoding section 233 to reproduce the program signal of the newly selected target from the recording and reproducing section 232. When the reproduction target change command is given, the control section 237 sends a clear image signal to the communication unit 213 through a CEC (Consumer Electronics Control Line) arrangement for HDMI communication or through an AV link stipulated as EN-50157 by the CENELEC (European Committee for Electro-technical Standardization). Thereafter, the control section 237 feeds an image clear command signal to the image clearing section 234. Upon receipt of an OSD image display start command, the control section 237 supplies a multiplex command signal to the OSD multiplexing section 235.

On receiving an image clear signal from the control section 237, the communication unit 213 forwards the received signal to the MPU 211 via the bus 37. Given a program signal from the OSD multiplexing section 235, the communication unit 213 sends the image signal and audio signal derived from the program signal to the image clearing section 251 in the image processing block 221 and to the audio processing block 222, respectively.

Upon receipt of an image clear signal from the communication unit 213, the MPU 211 forwards the signal to the frame rate converting section 61. Like the MPU 31 in FIG. 3, given an input change command or a channel change command from the input unit 38, the MPU 211 sends an image clear command signal to the image clearing section 251 and an image clear signal to the frame rate converting section 61. Furthermore, like the MPU 31 in FIG. 3 or the MPU 151 in FIG. 11, the MPU 211 feeds a multiplex command signal to the OSD multiplexing section 12 in response to an OSD image display start command coming from the input unit 38.

The image processing block 221 in FIG. 16 is constituted by the OSD multiplexing section 12, frame rate converting section 61, and image clearing section 251. The display unit 35 is formed by the panel driving section 14 and display panel 15.

The image clearing section 251 is fed with the image signal derived from the program signal supplied by the decode processing unit 33 or by the communication unit 213. Given an image clear command signal from the MPU 211, the image clearing section 251 clears the input image signal coming from the decode processing unit 33 or from the communication unit 213. The image clearing section 251 supplies the OSD multiplexing section 12 with the input image signal cleared of its image or with the input image signal without modification.

Figure 17:
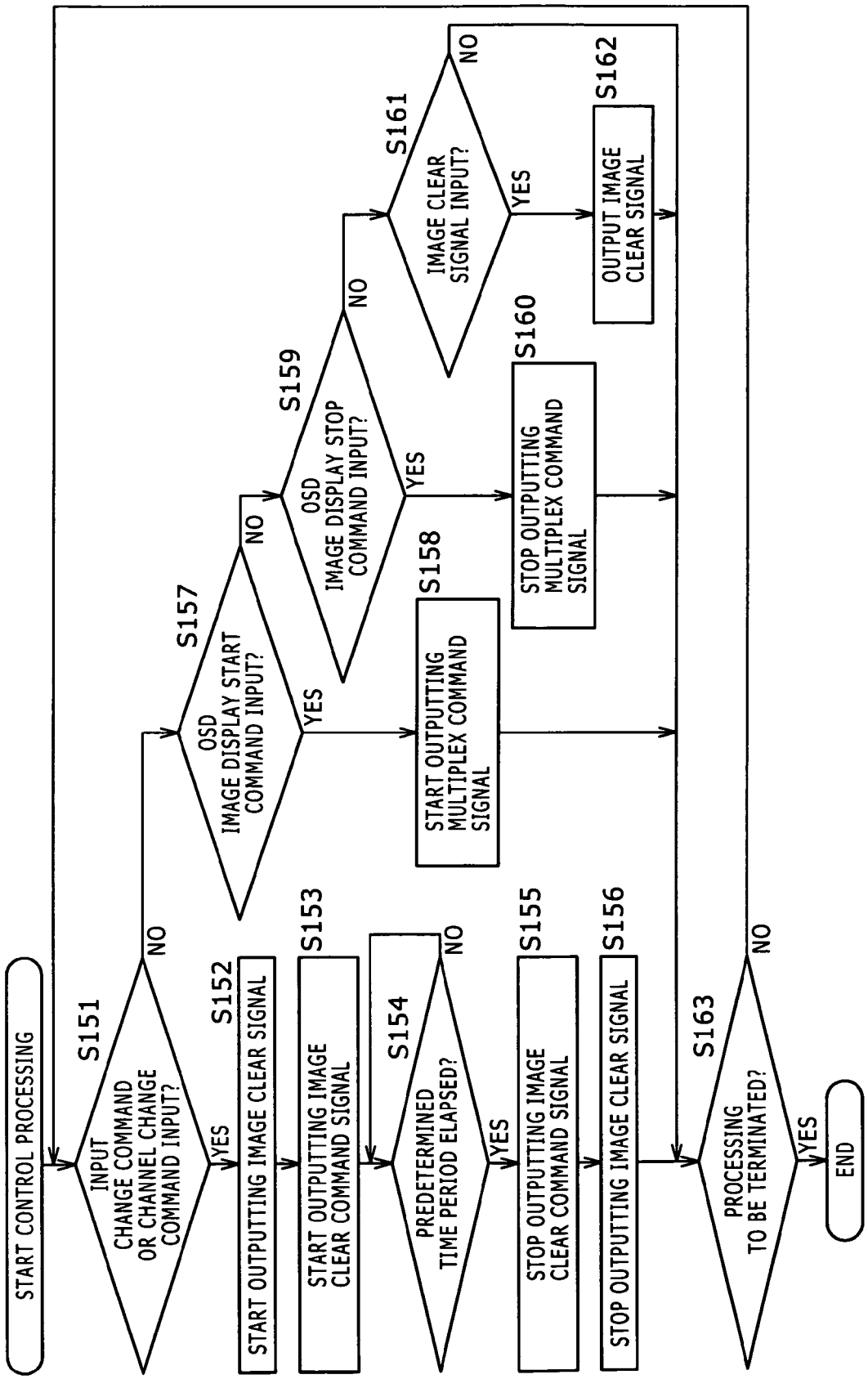
FIG. 17 is a flowchart of steps constituting control processing carried out by an MPU included in FIG. 15.

Described below with reference to FIG. 17 is how control processing is carried out by the MPU 211 in FIG. 15. The control processing is started illustratively when the receiving apparatus 201 is switched on.

Steps S151 through S160 in FIG. 17 are the same as steps S11 through S20 in FIG. 8 and thus will not be discussed further.

In step S159, the MPU 211 checks to determine whether an OSD image display stop command is input. If the OSD image display stop command is not found input in step S159, then step S161 is reached. In step S161, the MPU 211 checks to determine whether an image clear signal is input from the control section 237 of the recording and reproducing apparatus 202 through the communication unit 213. If in step S161 the image clear signal is found input, then step S162 is reached. In step S162, with the input image signal found cleared of its image following transmission from the recording and reproducing apparatus 202, the MPU 211 outputs an image clear signal to the frame rate converting section 61 in the image processing block 221.

If in step S161 the image clear signal is not found input, then step S163 is reached.

In step S163, the MPU 211 checks to determine whether the control processing is designated to be terminated. Illustratively, a check is made to determine if a power-off command is input from the input unit 38. If in step S163 the control processing is not found designated to be terminated, then control is returned to step S151 and the subsequent steps are repeated. If in step S163 the control processing is found designated to be terminated, then the processing is brought to an end.

The image processing performed by the receiving apparatus 201 in FIG. 15 is the same as the image processing shown in FIG. 9 and thus will not be described further. It should be noted that the image processing by the receiving apparatus 201 is started illustratively when an input image signal is input to the image processing block 221 from the decode processing unit 33 or from the communication unit 213.

In the foregoing description, the image signal interposed chronologically at midpoint between two consecutive image signals was shown to be interpolated. Alternatively, an image signal occurring at any given point in time may be interpolated.

In this specification, the steps describing the programs stored on the program recording medium represent not only the processes that are to be carried out in the depicted sequence (i.e., on a time series basis) but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing apparatus comprising:
   detecting means for detecting a motion vector from an input image signal, in which the input image signal acts as the image signal for each of chronologically input pixels;
   determining means for determining whether said input image signal is cleared; and
   interpolating means for interpolating and outputting, if said input image signal is not found cleared, an input image signal intermediate signal interposed at a predetermined point in time between the uncleared input image signal and a preceding input image signal that precedes said uncleared input signal, in accordance with said motion vector; and if said input image signal is found cleared, then said interpolating means allows said input image signal to be output unchanged as said input image signal intermediate signal.

2. The image processing apparatus according to claim 1, further comprising
   image clearing means for clearing said input image signal.

3. The image processing apparatus according to claim 2, further comprising:
   receiving means for receiving a predetermined command, wherein, if said predetermined command is received, then said determining means determines that said input image signal is cleared; and
   if said predetermined command is received, then said image clearing means clears said input image signal.

4. The image processing apparatus according to claim 1, wherein said determining means determines whether said input image signal is cleared based on a histogram of levels in said input image signal, on the number of pixels for which said input image signal is at a zero level, and on chronological changes of said input image signal.

5. The image processing apparatus according to claim 1, further comprising acquiring means for acquiring an image clear signal which is input from another apparatus and which indicates that said input image signal is cleared;
   wherein said input image signal is input from said another apparatus; and
   said determining means determines whether said input image signal is cleared in accordance with said image clear signal.

6. An image processing method for use with an image processing apparatus for interpolating an input image signal, in which the input image signal acts as the image signal for each of chronologically input pixels, said image processing method comprising the steps of:
   detecting a motion vector from said input image signal;
   determining whether said input image signal is cleared;
   interpolating and outputting, if said input image signal is not found cleared, an input image signal intermediate signal interposed at a predetermined point in time between the uncleared input image signal and a preceding input image signal that precedes said uncleared input signal, in accordance with said motion vector; and
   allowing said input image signal, if said input image signal is found cleared, to be output unchanged as said input image signal intermediate signal.

7. A non-transitory computer readable recording medium having stored thereon a program for causing a computer to perform an image processing procedure for interpolating an input image signal, in which the input image signal acts as the image signal for each of chronologically input pixels, said image processing procedure comprising the steps of:

detecting a motion vector from said input image signal;

determining whether said input image signal is cleared;

interpolating and outputting, if said input image signal is not found cleared, an input image signal intermediate signal interposed at a predetermined point in time between the uncleared input image signal and a preceding input image signal that precedes said uncleared input signal, in accordance with said motion vector; and allowing said input image signal, if said input image signal is found cleared, to be output unchanged as said input image signal intermediate signal.

8. An image processing apparatus comprising:

a detecting section configured to detect a motion vector from an input image signal, in which the input image signal acts as the image signal for each of chronologically input pixels;

a determining section configured to determine whether said input image signal is cleared; and an interpolating section configured such that if said input image signal is not found cleared, then said interpolating section interpolates and outputs an input image signal intermediate signal interposed at a predetermined point in time between the uncleared input image signal and a preceding input image signal that precedes said uncleared input signal, in accordance with said motion vector; and if said input image signal is found cleared, then said interpolating section allows said input image signal to be output unchanged as said input image signal intermediate signal.

* * * * *